US009006663B2

(12) United States Patent
Williams

(10) Patent No.: US 9,006,663 B2
(45) Date of Patent: Apr. 14, 2015

(54) RADIATION DOSIMETER DETECTION SYSTEM AND METHOD

(75) Inventor: Grant Victor McLelland Williams, Lower Hutt (NZ)

(73) Assignee: Industrial Research Limited, Lower Hutt (NZ)

( * ) Notice: Subject to any disclaimer, the term of this patent is extended or adjusted under 35 U.S.C. 154(b) by 102 days.

(21) Appl. No.: 13/824,003

(22) PCT Filed: Sep. 19, 2011

(86) PCT No.: PCT/NZ2011/000194
§ 371 (c)(1),
(2), (4) Date: Jun. 7, 2013

(87) PCT Pub. No.: WO2012/036570
PCT Pub. Date: Mar. 22, 2012

(65) Prior Publication Data
US 2013/0248721 A1    Sep. 26, 2013

(30) Foreign Application Priority Data
Sep. 17, 2010 (NZ) ....................................... 588050

(51) Int. Cl.
G01T 1/02 (2006.01)
G01T 1/105 (2006.01)
(52) U.S. Cl.
CPC ................ *G01T 1/023* (2013.01); *G01T 1/105* (2013.01)
(58) Field of Classification Search
CPC ........................................................ G01T 1/02
USPC .......................................... 250/362, 363.01
See application file for complete search history.

(56) References Cited

U.S. PATENT DOCUMENTS 5,811,822 A    9/1998    Huston et al.
5,892,234 A    4/1999    McKeever et al.
(Continued)

FOREIGN PATENT DOCUMENTS

EP       1150303        10/2001
WO       2009/005377    1/2009

OTHER PUBLICATIONS

J.C. Polf et al., "Real-time luminescence from Al2O3 fiber dosimeters," Radiation Measurements, No. 38, 2004, pp. 227-240.
(Continued)

Primary Examiner — David Porta
Assistant Examiner — Faye Boosalis
(74) Attorney, Agent, or Firm — Dann, Dorfman, Herrell and Skillman, P.C.

(57) ABSTRACT

A method for real-time RL and/or ROSL dose rate measuring in an environment exposed to a radiation source(s). The method comprises the steps of exposing a dosimeter to the environment for irradiation by the radiation source(s), the dosimeter comprising a phosphor-doped fluoroperovskite compound, sensing the RL or ROSL emitted light from the dosimeter during irradiation by the radiation source(s) and generating a representative light detection signal, and recording or generating a real-time measure of dose rate in the environment based on the light detection signal. A radiation dosimeter detection system comprising a phosphor-doped fluoroperovskite compound, the dosimeter coupled to a detector by an optical fiber. The detector comprises first and second optical stimulation sources that transmit light over the optical fiber to the dosimeter in first and second wavelength ranges. An optical detector senses light emitted from the dosimeter from which read-out dose information is generated.

16 Claims, 10 Drawing Sheets

(56) References Cited

U.S. PATENT DOCUMENTS

| | | | |
|---|---|---|---|
| 6,087,666 | A | 7/2000 | Huston et al. |
| 6,420,724 | B1 | 7/2002 | Struye et al. |
| 6,936,830 | B2 | 8/2005 | Gaza et al. |
| 7,002,163 | B2 | 2/2006 | Polf et al. |
| 7,399,977 | B2 | 7/2008 | Rink et al. |
| 7,485,877 | B2 | 2/2009 | Kearfott |
| 8,563,949 | B2 * | 10/2013 | Dotzler et al. ............ 250/484.5 |
| 2002/0117614 | A1 | 8/2002 | More et al. |

OTHER PUBLICATIONS

G. Ranchoux et al., "Fibre Remote Optoelectronic Gamma Dosimetry Based on Optically Stimulated Luminescence of Al2O3:C," Radiation Protection Dosimetry, vol. 100, Nos. 1-4, 2002, pp. 255-260.

Carl John Marckmann et al., "Optical Fibre Dosemeter Systems for Clinical Applications Baed on Radioluminescence and Optically Stimulated Luminescence From Al2O3:C," Radiation Protection Dosimetry, vol. 120, Nos. 1-4, 2006, pp. 28-32.

David Klein et al., "Performance of a near-real-time KBr:Eu dosimetry system under computed tomography x-rays," Radiation Measurements, vol. 45, 2010, p. 663-667.

A. Fernandez Fernandez et al., "Real-Time fibre optic radiation dosimeters for nuclear environment monitoring around thermonuclear reactors," Fusion Engineering and Design, vol. 83. 2008, pp. 50-59.

R. Gaza et al., "A Real-Time, High-Resolution Optical Fibre Dosemeter Based on Optically Stimulated Luminescence (OSL) of KBr:Eu, for Potential Use During the Radiotherapy of Cancer," Radiation Protection Dosimetry, vol. 120, Nos. 1-4, 2006, pp. 14-19.

D.M. Klein et al., "Optically stimulated luminescence from KBr:Eu as a near-real-time dosimetry system," Radiation Measurements, vol. 43, 2008, pp. 883-887.

E.G. Yukihara et al., "Optically stimulated luminescence (OSL) dosimetry in medicine," Phys. Med. Biol., vol. 53, 2008. pp. R351-R379.

M.S. Akselrod et al., "Optically stimulated luminescence and its use in medical dosimetry," Radiation Measurements, vol. 41, 2007, pp. S78-S99.

* cited by examiner

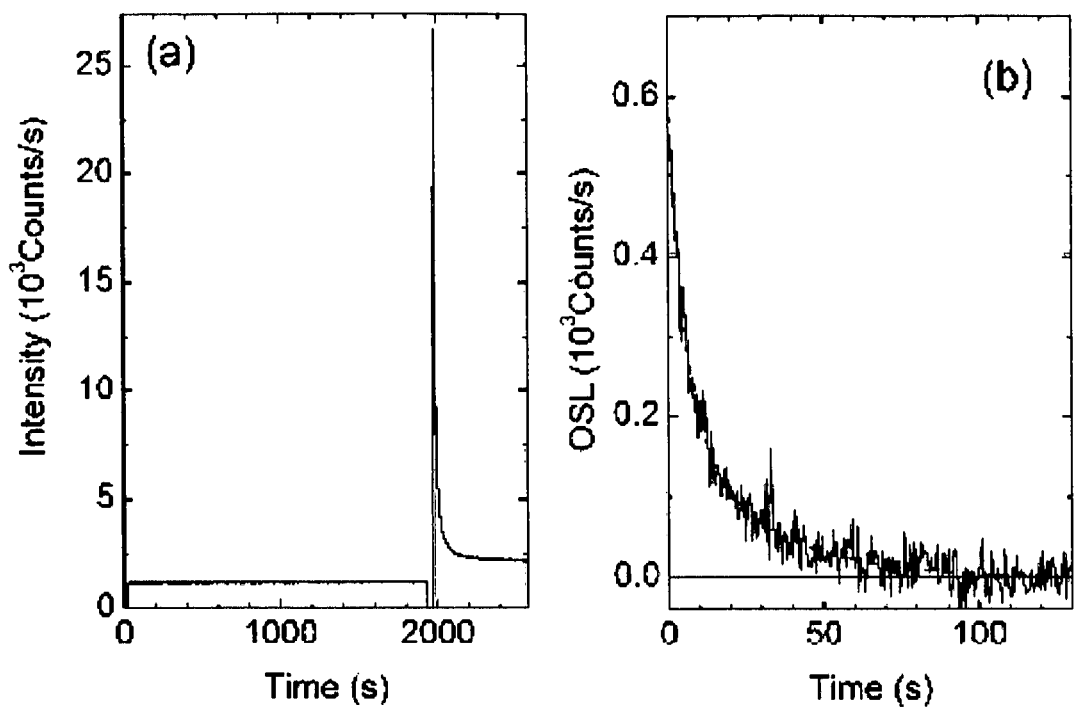
FIGURE 3A FIGURE 3B
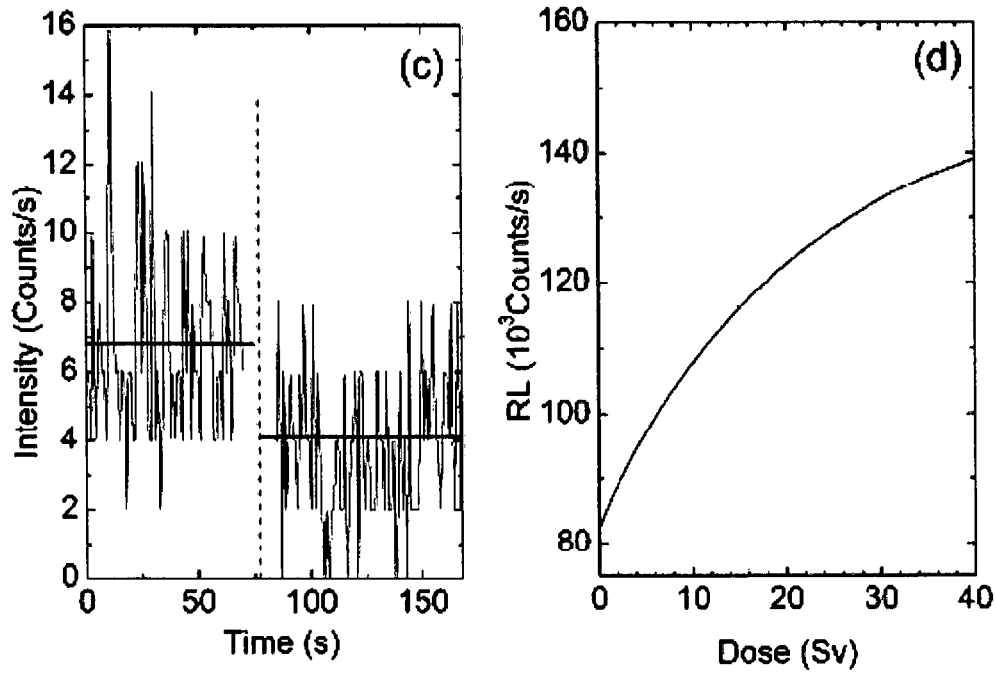
FIGURE 3C FIGURE 3D

RADIATION DOSIMETER DETECTION SYSTEM AND METHOD

FIELD OF THE INVENTION

The present invention relates to a radiation dosimeter detection system. In particular, although not exclusively, the dosimeter detects ionizing radiation based on Optically Stimulated Luminescence (OSL) and/or Radio luminescence (RL).

BACKGROUND TO THE INVENTION

Dosimeters measure an individual's or an object's exposure to something in the environment, particularly to a hazard inflicting cumulative impact over longer periods of time, or over a lifetime. Radiation dosimeters measure exposure to ionizing radiation, such as x-rays, gamma rays, neutrons, alpha particles, beta particles, and other charged particles (e.g. protons for radiotherapy). This ionizing radiation remains undetectable by the human senses and the damage the radiation causes to the body is cumulative, related to the total dose received. Therefore, workers who are exposed to radiation, such as radiographers, nuclear power plant workers, doctors using radiotherapy, and workers in laboratories are often required to wear dosimeters so that the employers can keep a record of their exposure to verify that it is below legally prescribed limits. Thermally Stimulated Luminescence (TSL) dosimeters are the most common type of wearable dosimeters for ionizing radiation. Hand held dosimeters are also available for radiation detection and these include ionization based systems (e.g. Geiger counters) and systems with solid state detectors (e.g. MOSFETs using silicon semiconductors).

TSL dosimeters (for example, LiF:Mg:Ti) are widely used for accurate measurements of the radiation dose upon exposure to ionizing radiation. The ionizing radiation leads to trapped electrons and holes. The dose information is read by heating the dosimeter at a controlled rate to high temperatures. The integrated emitted luminescence intensity and the glow curves can be used to determine the radiation dose and radiation type. This type of dosimeter typically requires an expensive reader and a sophisticated time dependent temperature profile, the dose information can only be read after the irradiation has occurred, and the readout process destroys all dose information.

OSL dosimeters have recently been developed and the main commercial OSL dosimeter is based on $Al_2O_3$:C. BeO is also being researched as an OSL dosimeter compound. Exposure to ionizing radiation leads to trapped electrons and holes. The OSL read-out process is via exposure to light, and the emitted light intensity provides the dose information. This type of dosimeter has the advantage that dose information can be read by optical means, and no heating is required.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved radiation dosimeter detection system that is capable of recording different types of dose information and/or an improved method of real-time dose rate monitoring, or to at least provide the public with a useful choice.

SUMMARY OF THE INVENTION

In a first aspect, the present invention broadly consists in a radiation dosimeter detection system for recording dose information about ionizing radiation absorbed and stored in one or more dosimeters located in an environment exposed to a radiation source(s), comprising:

at least one dosimeter comprising a phosphor-doped fluoroperovskite compound that is configured to absorb radiation from the environment within which it is located, the dosimeter being optically coupled to a detector by an optical fibre, the detector comprising:
a first optical stimulation source that is operable to emit stimulating light over the optical fibre to the dosimeter at a wavelength(s) in a first wavelength range;
a second optical stimulation source that is operable to emit stimulating light over the optical fibre to the dosimeter at a wavelength(s) in a second wavelength range;
an optical detector that is configured to receive and sense light emitted from the dosimeter over the optical fibre and which in response generates light detection signals representing the read-out dose information stored in the dosimeter; and
a control system that is configured to process the light detection signals from the optical detector and output the read-out dose information, and which is operable or configured to selectively operate either or both of the first or second optical stimulation sources so as to selectively read-out dose information.

The dose information may be in the form of the instantaneous dose rate, short irradiation dose, or the cumulative dose (total dose after a series of doses).

In one embodiment, the control system is selectively operable in different read-out modes. For example, the control system may be selectively operable in two or more of the following modes: OSL, OPROSL, RL, or ROSL.

The detector may be operated in an OSL mode in which the dosimeter emits light (OSL signal) only in response to being stimulated by stimulating light from one of the optical stimulation sources, in an RL mode in which the dosimeter emits light (RL signal) during irradiation in the absence of stimulating light, in a radio and optically stimulated luminescence (ROSL) mode in the presence of continual stimulation by light from one of the optical stimulation sources and continual irradiation, or in optically pulsed radio and optically stimulated luminescence (OPROSL) mode in the presence of pulsed stimulation by one or both of the optical sources and continual irradiation.

The system may be selectively operated or switchable between the OSL, RL, ROSL, or OPROSL modes, depending on the dose information to be read-out from the dosimeter.

In a first embodiment, the system is configured or operates in OSL or OPROSL mode. In this embodiment, the first optical stimulation source is operable to emit stimulating light over the optical fibre to the dosimeter at a wavelength(s) in a first wavelength range for reading-out from the dosimeter dose information in the form of the instantaneous dose rate based on the emitted light (OPROSL signal) from the dosimeter or the short irradiation dose after a short irradiation and based on the emitted light (OSL signal) from the dosimeter; and the second optical stimulation source that is operable to emit stimulating light over the optical fibre to the dosimeter at wavelength(s) in a second wavelength range for reading-out from the dosimeter dose information in the form of the cumulative dose based on the emitted light (OSL signal) from the dosimeter.

Preferably, the control system is operable to selectively operate either the first or second optical stimulation sources so as to selectively read-out, the instantaneous dose rate, the dose after a short irradiation, or the cumulative dose.

Preferably, the first wavelength range of the first optical stimulation source is in the infrared band for reading-out instantaneous dose rate or short irradiation dose from the dosimeter in the OPROSL or OSL modes. Preferably, the first wavelength range comprises wavelength(s) in the infrared band above approximately 750 nm. More preferably, the first wavelength range is between approximately 750 nm to approximately 2000 nm. In one embodiment, the first optical stimulation source is operable to emit stimulating light at a wavelength of approximately 940 nm. In another embodiment, the first optical stimulation source is operable to emit stimulating light at a wavelength in the range of between approximately 750 nm to approximately 940 nm. In either of these embodiments, the first optical stimulation source may be an LED, a fibre-coupled LED, or a fibre-coupled laser diode for example.

In one operational mode, the first optical stimulation source is configured or operated to emit pulsed stimulating light during irradiation of the dosimeter for reading out the instantaneous dose rate from the dosimeter (OPROSL).

In another operational mode, the first optical stimulation source is configured or operated to emit continuous light after irradiation of the dosimeter for reading out the short irradiation dose from the dosimeter (OSL). By way of example, this operational mode allows the dose for each irradiation to be read out. This operational mode may, by way of example only, be useful in radiotherapy applications where there might be a series of doses during radiotherapy and the dose for each radiation cycle will need to be known. The total cumulative dose can then be read out using the second optical stimulation source as set out below.

Preferably, the second wavelength range of the second optical stimulation source is in the ultraviolet to visible band for reading-out cumulative dose from the dosimeter in OSL mode after irradiation. Preferably, the second wavelength range is approximately 280 nm to approximately 600 nm. In one form, the second optical stimulation source is configured or operated to emit continuous stimulating light for reading out the cumulative dose from the dosimeter. Preferably, the second optical stimulation source is configured or operated such that the stimulating light causes bleaching or resetting to zero of the stored dose information in the dosimeter after the cumulative dose has been read out. In one embodiment, the second optical stimulation source is operable to emit stimulating light at a wavelength of approximately 505 nm. In another embodiment the second optical stimulation source is operable to emit stimulating light at a Wavelength of approximately 470 nm. In another embodiment the second optical stimulation source is operable to emit stimulating light at a wavelength of approximately 405 nm. In any of these embodiments, the second optical stimulation source may be an LED, fibre-coupled LED, or fibre-coupled laser diode.

In a second embodiment, the system is configured or operates in the RL or ROSL mode. In this embodiment, the control system is operable to selectively operate either or both or none (i.e. activate or deactivate either or both) of the first or second optical stimulation sources so as to read-out instantaneous dose rate from the dosimeter based on the emitted light (RL or ROSL signal) from the dosimeter.

In one operational mode, for higher doses, the first and/or second optical stimulation sources are configured or operated to continuously emit stimulating light into the dosimeter during read-out of the instantaneous dose rate from the dosimeter (ROSL mode). Continual illumination of the dosimeter for higher doses generates an emitted ROSL signal intensity during irradiation that is substantially dose independent and dose rate can be derived directly from this signal. Preferably, the first and/or second wavelength ranges, individually or collectively, are approximately 300 nm to approximately 600 nm. More preferably, the first and/or second optical stimulation source are operable to emit stimulating light at a wavelength(s) in a range of approximately 400 nm to approximately 600 nm, even more preferably approximately 400 nm to 530 nm, even more preferably approximately 400 nm to approximately 480 nm, and even more preferably approximately 405 nm to approximately 470 nm. In one form, the first and second optical sources are configured or operated to emit light at the same wavelength(s) when the system is operated in RL mode.

By way of example, the control system may be configured to operate in the high dose operational mode for dosimeter(s) exposed to high doses in the range of approximately 0.1 Sv to approximately 1000 Sv.

In another operational mode, for lower doses, neither of the optical stimulation sources are operated (i.e. no stimulation light) as the emitted RL signal intensity during irradiation is substantially independent of dose and dose rate can be derived directly from this signal. By way of example, the control system may be configured to operate in the low dose operational mode for dosimeter(s) exposed to low doses below approximately 0.1 Sv.

It will be appreciated that the configuration, operation, components and features of the first and second embodiments may be interchanged and combined into various forms of the system as desired.

The following features may apply to any one or more of the above embodiments of the invention:

The optical stimulation sources may be in the form of Light Emitting Diodes (LEDs), lasers or any other suitable light source for generating light in the desired wavelengths.

In one form, the first and optical stimulation source is configured or operated to emit light at a first wavelength in the first wavelength range and the second optical stimulation source is configured to emit light at a second wavelength in the second wavelength range. Preferably, the first and second wavelengths are selected according to the trap distribution profile of the particular fluoroperovskite compound of the dosimeter.

In an alternative form, the first and second optical stimulation sources are configured or operable to selectively emit light at a plurality of different wavelengths within their respective first and second wavelength ranges.

Preferably, the stimulating wavelength(s) of the optical stimulation sources are longer than the wavelength(s) of the emitted light from the dosimeter.

Preferably, the stimulating wavelengths in the wavelength range correspond to the trap distribution profile of the particular fluoroperovskite compound. Preferably, stimulating light has a longer wavelength than the emitted light representing the dose-rate or cumulative dose being read-out Preferably, the optical detector is a photomultiplier tube (PMT) that is connected to a photon counter module that generates a light detection signal in the form of an output pulse signal for each photon detected. More preferably, the optical stimulation sources configured to emit stimulating light at wavelengths that are longer than the detection wavelength range of the PMT. In the preferred form, electronic circuitry is employed to stretch the width of the pulse emitted from the photon counter for easier detection by an input/output interface associated with the control system. For example, the control system may comprise a pulse stretching module that is configured to increase the width of the pulses of the output pulse signal from the photon counter module and output a modified pulse signal for extraction of the read-out dose information.

Preferably, the control system includes a processor and memory for processing the light detection signal and extracting dose information from the light detection signal, including information indicative of dose rate, dose, or cumulative dose, depending on the configuration of the dosimeter(s) in the environment.

In one form, the dose rate is proportional to the photon-count rate of the light detection signal, and the dose or cumulative dose is proportional to the total photon count of the light detection signal during the read-out period.

In one embodiment, the phosphor-doped fluoroperovskite compound of the dosimeter is selected from the following: $NaMgF_3:Eu^{2+}$, $NaMgF_3:Mn^{2+}$, $RbMgF_3:Eu^{2+}$, $RbMgF_3:Mn^{2+}$, $RbCdF_3:Mn^{2+}$, and $CsCdF_3:Mn^{2+}$.

In one embodiment, the system is in use configured to record dose information in radiotherapy.

In one embodiment, the system comprises multiple dosimeters and the control system is operable to selectively read-out dose information from each dosimeter independently.

In a second aspect, the present invention broadly consists in a method for real-time RL and/or ROSL dose rate measuring in an environment exposed to a radiation source(s), comprising the steps of:
    exposing a dosimeter to the environment for irradiation by the radiation source(s), the dosimeter comprising a phosphor-doped fluoroperovskite compound;
    sensing the RL or ROSL emitted light from the dosimeter during irradiation by the radiation source(s) and generating a representative light detection signal; and
    recording or generating a real-time measure of dose rate in the environment based on the light detection signal.

In one embodiment, for high doses in the range of approximately 0.1 Sv to 1000 Sv, the method further comprises the step of continually illuminating the dosimeter with stimulating light at a wavelength(s) in a wavelength range of approximately 300 nm to approximately 600 nm during irradiation and sensing the ROSL emitted light during the illumination of the dosimeter (ROSL mode). Continual illumination of the dosimeter for higher doses generates an emitted ROSL signal intensity during irradiation that is substantially dose independent and dose rate can be derived directly from this signal.

Preferably, the stimulating wavelength and light intensity are selected so as to achieve a steady state condition in the dosimeter such that the ROSL emitted light is substantially dose independent and directly proportional to the dose rate.

More preferably, the wavelength range is in the range of approximately 400 nm to approximately 600 nm, even more preferably approximately 400 nm to approximately 530 nm, even more preferably approximately 400 nm to approximately 480 nm, and even more preferably approximately 405 nm to approximately 470 nm. In one embodiment, it is preferred to employ the shortest wavelengths in the above ranges so that the required stimulation light intensity can be minimised.

In some embodiments, the following stimulation sources may be employed to generate the stimulating light: 515 nm LED, 450 nm LED, or a Blu-ray laser diode 405 nm.

Preferably, the stimulating light is continuous light (i.e. not pulsed light).

Preferably, the stimulating light has an intensity above approximately 1 $mW/mm^2$. More preferably, the intensity needs to be high enough so that a steady state condition is achieved quickly such that the photon count rate is independent of dose and proportional to the dose rate. Even more preferably, the light intensity is above 1 $mW/mm^2$ but below 10,000 $mW/mm^2$.

Preferably, the step of continually illuminating the dosimeter comprises operating a light stimulation source to emit the stimulating light to the dosimeter over an optical fibre that couples the light stimulation source to the dosimeter.

Preferably, the step of generating a real-time measure of dose rate in the environment is based on a directly proportional relationship of the dose rate to the ROSL light detection signal.

In another embodiment, for lower doses below approximately 0.1 Sv, the RL emitted light during irradiation is approximately dose independent such that the dose rate can be derived directly from this RL signal in the absence of any illumination of the dosimeter with stimulating light.

Preferably, for a dosimeter exposed to a low dose below approximately 0.1 Sv, the step of generating a real-time measure of dose rate in the environment is based on a directly proportional relationship of the dose rate to the RL light detection signal.

Preferably, the step of sensing the RL or ROSL emitted light from the dosimeter comprises operating an optical detector to sense light emitted from the dosimeter over an optical fibre that couples the optical detector to the dosimeter. More preferably, this step comprises generating a light detection signal in the form of a pulse signal for each photon detected.

Preferably, the step of recording or generating a real-time measure of dose rate in the environment based on the RL or ROSL emitted light comprises photon-counting the pulse signal to generate a measure of dose rate. More preferably, the count rate is directly proportional to the dose rate.

The second aspect of the invention may be implemented with the system of the first aspect of the invention or otherwise implemented with any other suitable system configuration. The second aspect of the invention may have any one or more of the features mentioned in respect of the first aspect of the invention.

The phrase "phosphor-doped fluoroperovskite compound" as used in this specification and claims is intended to mean any one or more compounds falling within the group of compounds defined by the following statements, whether individually or in combination:

In one embodiment, the phosphor-doped fluoroperovskite compound is selected from the group consisting of:
    $Na_{1-(x+x')}K_xRb_{x'}Mg_{1-y}Zn_yF_{3-z}Cl_z:Z^{d+}$ wherein $Z^{d+}$ is the dopant phosphor ion and is selected from the group consisting of the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and wherein $(x+x')\le 0.1$, $y\le 0.1$ and $z\le 0.3$;
    $K_{1-(x+x')}Na_xRb_{x'}Mg_{1-y}Zn_yF_{3-z}Cl_z:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and wherein $(x+x')\le 0.1$, $y\le 0.1$ and $z\le 0.3$; and
    $Rb_{1-(x+x')}Na_xK_{x'}Mg_{1-y}Zn_yF_{3-z}Cl_z:Z^{d+}$ wherein $Z^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Eu^{2+}$; $Sm^{2+}$;

Sm$^{3+}$; Pr$^{3+}$; Ce$^{3+}$; Gd$^{3+}$; and Tb$^{3+}$; and Tl$^+$; In$^k$; Ga$^+$; and Pb$^{2+}$; and wherein (x+x')≤0.1, y≤0.1 and z≤0.3;
and mixtures of any two or more thereof.

In one embodiment, wherein the phosphor-doped fluoroperovskite compound is Na$_{1-(x+x')}$K$_x$Rb$_{x'}$Mg$_{1-y}$Zn$_y$F$_{3-z}$Cl$_z$:Z$^{d+}$, the dopant phosphor ion is selected from the group consisting of the transition metal ions: Cu$^+$; Ag$^+$; Mn$^{2+}$; Mn$^{3+}$; Mn$^{4+}$; and Cr$^{3+}$; and the rare earth metal ions: Eu$^{2+}$; Sm$^{2+}$; Sm$^{3+}$; Pr$^{3+}$; Gd$^{3+}$; and Tb$^{3+}$.

In a preferred embodiment, wherein the phosphor-doped fluoroperovskite compound is Na$_{1-(x+x')}$K$_x$Rb$_{x'}$Mg$_{1-y}$Zn$_y$F$_{3-z}$Cl$_z$:Z$^{d+}$, the dopant phosphor ion is selected from the group consisting of: Eu$^{2+}$; Pr$^{3+}$; Tb$^{3+}$; and Mn$^{2+}$.

In a preferred embodiment, wherein the phosphor-doped fluoroperovskite compound is Na$_{1-(x+x')}$K$_x$Rb$_{x'}$Mg$_{1-y}$Zn$_y$F$_{3-z}$Cl$_z$:Z$^{d+}$, the dopant phosphor ion is Pr$^{3+}$ or Tb$^{3+}$.

In a preferred embodiment, wherein the phosphor-doped fluoroperovskite compound is Na$_{1-(x+x')}$K$_x$Rb$_{x'}$Mg$_{1-y}$Zn$_y$F$_{3-z}$Cl$_z$:Z$^{d+}$, the dopant phosphor ion is Pr$^{3+}$.

In a preferred embodiment, wherein the phosphor-doped fluoroperovskite compound is Na$_{1-(x+x')}$K$_x$Rb$_{x'}$Mg$_{1-y}$Zn$_y$F$_{3-z}$Cl$_z$:Z$^{d+}$, the dopant phosphor ion is Tb$^{3+}$.

In a preferred embodiment, wherein the phosphor-doped fluoroperovskite compound is Na$_{1-(x+x')}$K$_x$Rb$_{x'}$Mg$_{1-y}$Zn$_y$F$_{3-z}$Cl$_z$:Z$^{d+}$, the dopant phosphor ion is Eu$^{2+}$ or Mn$^{2+}$.

In a preferred embodiment, wherein the phosphor-doped fluoroperovskite compound is Na$_{1-(x+x')}$K$_x$Rb$_{x'}$Mg$_{1-y}$Zn$_y$F$_{3-z}$Cl$_z$:Z$^{d+}$, the dopant phosphor ion is Eu$^{2+}$.

In a preferred embodiment, wherein the phosphor-doped fluoroperovskite compound is Na$_{1-(x+x')}$K$_x$Rb$_{x'}$Mg$_{1-y}$Zn$_y$F$_{3-z}$Cl$_z$:Z$^{d+}$, the dopant phosphor ion is Mn$^{2+}$.

In one embodiment, wherein the phosphor-doped fluoroperovskite compound is K$_{1-(x+x')}$Na$_x$Rb$_{x'}$Mg$_{1-y}$Zn$_y$F$_{3-z}$Cl$_z$:Z$^{d+}$, the dopant phosphor ion is selected from the group consisting of the transition metal ions: Cu$^+$; Ag$^+$; Mn$^{2+}$; Mn$^{3+}$; Mn$^{4+}$; and Cr$^{3+}$; and the rare earth metal ions: Eu$^{2+}$; Sm$^{2+}$; Sm$^{3+}$; Pr$^{3+}$; Gd$^{3+}$; and Tb$^{3+}$.

In a preferred embodiment, wherein the phosphor-doped fluoroperovskite compound is K$_{1-(x+x')}$Na$_x$Rb$_{x'}$Mg$_{1-y}$Zn$_y$F$_{3-z}$Cl$_z$:Z$^{d+}$, the dopant phosphor ion is Eu$^{2+}$.

In one embodiment, wherein the phosphor-doped fluoroperovskite compound is Rb$_{1-(x+x')}$Na$_x$K$_{x'}$Mg$_{1-y}$Zn$_y$F$_{3-z}$Cl$_z$:Z$^{d+}$, the dopant phosphor ion is selected from the group consisting of the transition metal ions: Cu$^+$; Ag$^+$; Mn$^{3+}$; Mn$^{4+}$; and Cr$^{3+}$; and the rare earth metal ions: Eu$^{2+}$; Sm$^{2+}$; Sm$^{3+}$; Pr$^{3+}$; Ce$^{3+}$; Gd$^{3+}$; and Tb$^{3+}$.

In a preferred embodiment, wherein the phosphor-doped fluoroperovskite compound is Rb$_{1-(x+x')}$Na$_x$K$_{x'}$Mg$_{1-y}$Zn$_y$F$_{3-z}$Cl$_z$:Z$^{d+}$, the dopant phosphor ion is Eu$^{2+}$ or Ce$^{3+}$.

In a preferred embodiment, wherein the phosphor-doped fluoroperovskite compound is Rb$_{1-(x+x')}$Na$_x$K$_{x'}$Mg$_{1-y}$Zn$_y$F$_{3-1}$Cl$_z$:Z$^{d+}$, the dopant phosphor ion is Eu$^{2+}$.

In a preferred embodiment, wherein the phosphor-doped fluoroperovskite compound is Rb$_{1-(x+x')}$Na$_x$K$_{x'}$Mg$_{1-y}$Zn$_y$F$_{3-z}$Cl$_2$:Z$^{d+}$, the dopant phosphor ion is Ce$^{3+}$.

In one embodiment, x, x', y and z are all about 0.

In another embodiment, the phosphor-doped fluoroperovskite compound is selected from the group consisting of:

NaMgF$_3$:Z$^{d+}$ wherein Z$^{d+}$ is the dopant phosphor ion and is selected from the group consisting of: the transition metal ions: Cu$^+$; Ag$^+$; Mn$^{2+}$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Gd$^{3+}$; and Tb$^{3+}$; and Tl$^+$, In$^+$, Ga$^+$, and Pb$^{2+}$;

KMgF$_3$:Z$^{d+}$ wherein Z$^{d+}$ is the dopant phosphor ion and is selected from the group consisting of: the transition metal ions: Cu$^+$; Ag$^+$; Mn$^{2+}$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Gd$^{3+}$; and Tb$^{3+}$; and Tl$^+$; In$^+$; Ga$^+$; and Pb$^{2+}$; and RbMgF$_3$:Z$^{d+}$ wherein Z$^{d+}$ is the dopant phosphor ion and is selected from the group consisting of: the transition metal ions: Cu$^+$; Ag$^+$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Ce$^{3+}$; Gd$^{3+}$; and Tb$^{3+}$; and Tl$^+$; In$^+$; Ga$^+$; and Pb$^{2+}$;

and mixtures of any two or more thereof.

In one embodiment, wherein the phosphor-doped fluoroperovskite compound is NaMgF$_3$:Z$^{d+}$, the dopant phosphor ion is selected from the group consisting of the transition metal ions: Cu$^+$; Ag$^+$; Mn$^{2+}$; Mn$^{3+}$; Mn$^{4+}$; and Cr$^{3+}$; and the rare earth metal ions: Eu$^{2+}$; Sm$^{2+}$; Sm$^{3+}$; Pr$^{3+}$; Gd$^{3+}$; and Tb$^{3+}$.

In a preferred embodiment, wherein the phosphor-doped fluoroperovskite compound is NaMgF$_3$:Z$^{d+}$, the dopant phosphor ion is selected from the group consisting of: Eu$^{2+}$; Pr$^{3+}$; Tb$^{3+}$; and Mn$^{2+}$.

In a preferred embodiment, wherein the phosphor-doped fluoroperovskite compound is NaMgF$_3$:Z$^{d+}$, the dopant phosphor ion is Pr$^{3+}$ or Tb$^{3+}$.

In a preferred embodiment, wherein the phosphor-doped fluoroperovskite compound is NaMgF$_3$:Z$^{d+}$, the dopant phosphor ion is Pr$^{3+}$.

In a preferred embodiment, wherein the phosphor-doped fluoroperovskite compound is NaMgF$_3$:Z$^{d+}$, the dopant phosphor ion is Tb$^{3+}$.

In a preferred embodiment, wherein the phosphor-doped fluoroperovskite compound is NaMgF$_3$:Z$^{d+}$, the dopant phosphor ion is Eu$^{2+}$ or Mn$^{2+}$.

In a preferred embodiment, wherein the phosphor-doped fluoroperovskite compound is NaMgF$_3$:Z$^{d+}$, the dopant phosphor ion is Eu$^{2+}$.

In a preferred embodiment, wherein the phosphor-doped fluoroperovskite compound is NaMgF$_3$:Z$^{d+}$, the dopant phosphor ion is Mn$^{2+}$.

In one embodiment, wherein the phosphor-doped fluoroperovskite compound is KMgF$_3$:Z$^{d+}$, the dopant phosphor ion is selected from the group consisting of: the transition metal ions: Cu$^+$; Ag$^+$; Mn$^{2+}$; Mn$^{3+}$; Mn$^{4+}$; and Cr$^{3+}$; and the rare earth metal ions: Eu$^{2+}$; Sm$^{2+}$; Sm$^{3+}$; Pr$^{3+}$; Gd$^{3+}$; and Tb$^{3+}$.

In a preferred embodiment, wherein the phosphor-doped fluoroperovskite compound is KMgF$_3$:Z$^{d+}$, the dopant phosphor ion is Eu$^{2+}$.

In one embodiment, wherein the phosphor-doped fluoroperovskite compound is RbMgF$_3$:Z$^{d+}$, the dopant phosphor ion is selected from the group consisting of: the transition metal ions: Cu$^+$; Ag$^+$; Mn$^{3+}$; Mn$^{4+}$; and Cr$^{3+}$; and the rare earth metal ions: Eu$^{2+}$; Sm$^{2+}$; Sm$^{3+}$; Pr$^{3+}$; Ce$^{3+}$; Gd$^{3+}$; and Tb$^{3+}$.

In a preferred embodiment, wherein the phosphor-doped fluoroperovskite compound is RbMgF$_3$:Z$^{d+}$, the dopant phosphor ion is Eu$^{2+}$ or Ce$^{3+}$.

In a preferred embodiment, wherein the phosphor-doped fluoroperovskite compound is RbMgF$_3$:Z$^{d+}$, the dopant phosphor ion is Eu$^{2+}$.

In a preferred embodiment, wherein the phosphor-doped fluoroperovskite compound is RbMgF$_3$:Z$^{d+}$, the dopant phosphor ion is Ce$^{3+}$.

In a preferred embodiment, the phosphor-doped fluoroperovskite compound is selected from the group consisting of: NaMgF$_3$:Eu$^{2+}$; NaMgF$_3$:Pr$^{3+}$; NaMgF$_3$:Tb$^{3+}$; NaMgF$_3$:Mn$^{2+}$; KMgF$_3$:Eu$^{2+}$; RbMgF$_3$:Eu$^{2+}$; and RbMgF$_3$:Ce$^{3+}$.

In a further preferred embodiment, the phosphor-doped fluoroperovskite compound is selected from the group consisting of: NaMgF$_3$:0.2% Eu$^{2+}$; NaMgF$_3$:0.1% Pr$^{3+}$; NaMgF$_3$:0.2% Tb$^{3+}$; NaMgF$_3$:0.2% Mn$^{2+}$; KMgF$_3$:0.2% Eu$^{2+}$; RbMgF$_3$:0.2% Eu$^{2+}$; and RbMgF$_3$:0.2% Ce$^{3+}$.

In a further preferred embodiment, the phosphor-doped fluoroperovskite compound is $NaMgF_3:0.2\%\ Eu^{2+}$.

In a further preferred embodiment, the phosphor-doped fluoroperovskite compound is $NaMgF_3:0.1\%\ Eu^{2+}$.

In a further preferred embodiment, the phosphor-doped fluoroperovskite compound is $RbMgF_3:0.2\%\ Eu^{2+}$.

In a further preferred embodiment, the phosphor-doped fluoroperovskite compound is $RbCdF_3:Mn^{2+}$. More preferably, the compound is $RbCdF_3:1\%\ Mn^{2+}$.

In a further preferred embodiment, the phosphor-doped fluoroperovskite compound is $CsCdF_3:Mn^{2+}$. More preferably, the compound is $CsCdF_3:0.2\%\ Mn^{2+}$.

Examples of the above compounds are further described in the applicant's application WO 2009/005377, the contents of which is herein incorporated by reference, and the compounds may be formed or produced using the methods described in that application or using any other suitable methods.

The term "light" as used in this specification and claims is intended to mean, unless the context suggests otherwise, light any of the ultraviolet, visible, and infrared bands.

The term "RL" in this specification and claims is intended to mean, unless the context suggests otherwise, the emission of light from a dosimeter compound during irradiation of the compound with ionizing radiation.

The term "OSL" in this specification and claims is intended to mean, unless the context suggests otherwise, the emission of light from a dosimeter compound during illumination of the compound with light at a different wavelength and after exposure of the compound to ionizing radiation.

The term "ROSL" in this specification and claims is intended to mean, unless the context suggests otherwise, the emission of light from a dosimeter compound during continual illumination of the compound with light at a different wavelength and during continual exposure of the compound to ionizing radiation.

The term "OPROSL" in this specification and claims is intended to mean, unless the context suggests otherwise, the emission of light from a dosimeter compound during pulsed illumination of the compound with light at a different wavelength and during continual exposure of the compound to ionizing radiation.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIG. 3a shows a plot of the RL followed by OSL emitted light intensity for a fluoroperovskite compound sample that was exposed to a dose rate of 10.5 µSv/s;

FIG. 3b shows a plot of OSL emitted light intensity decay for the fluoroperovskite sample after a short dose of 300 µSv;

FIG. 3c shows a plot of the emitted light intensity from the fluoroperovskite sample when exposed to a dose rate 0.015 µSv/s for times less than 75 s;

FIG. 3d shows a plot of the RL emitted light intensity for a fluoroperovskite sample at a dose rate of 0.73 mSv/s;

FIG. 7b shows a plot of experimental results of integrated radioluminescence response against absorbed dose for the 4 fluoroperovskite compounds of FIG. 7a.

DETAILED DESCRIPTION OF PREFERRED EMBODIMENTS

1. Overview

Figure 1:
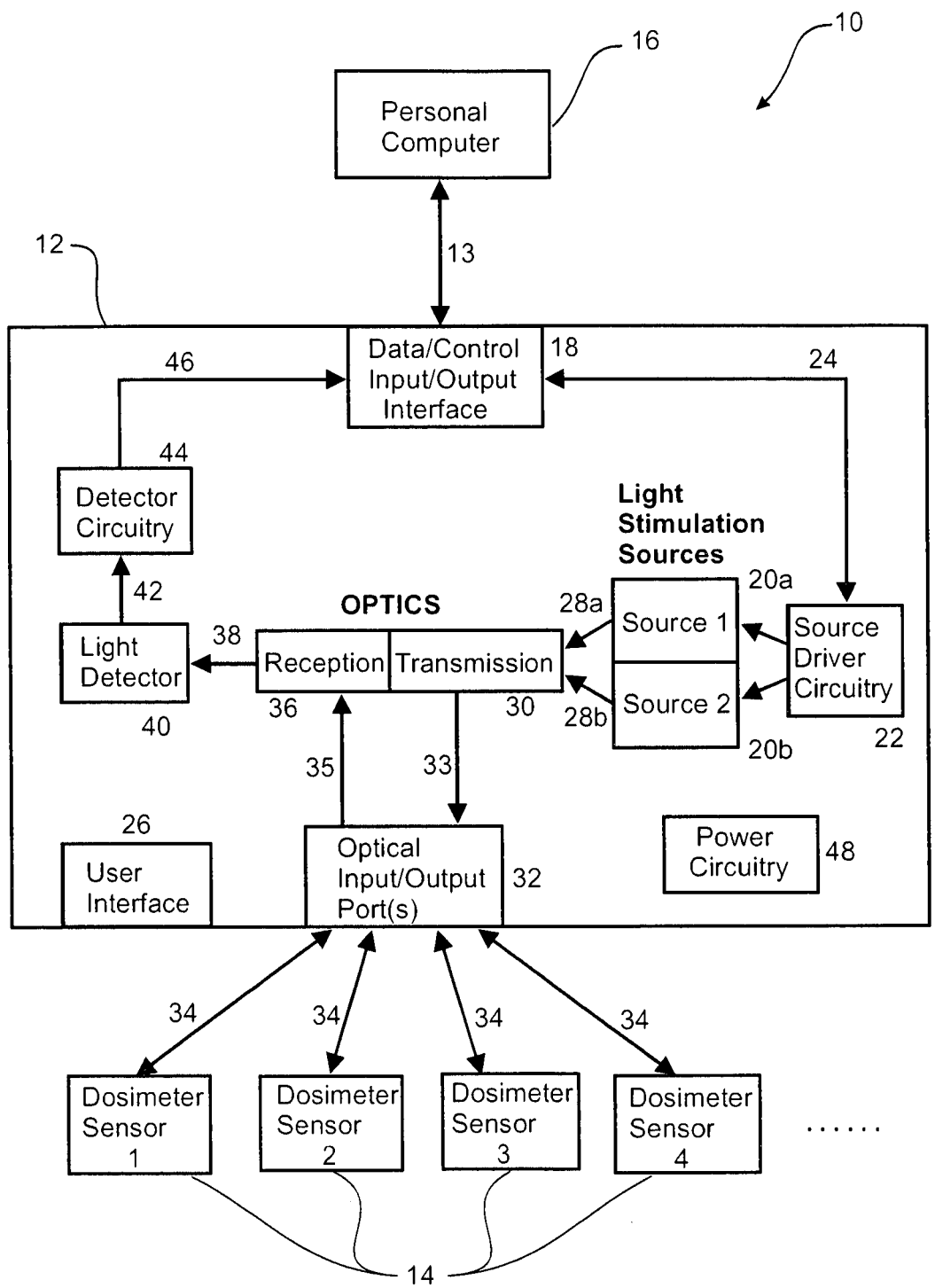
FIG. 1 shows a schematic block diagram of a radiation dosimeter detection system in accordance with an embodiment of the invention.

The present invention relates to a radiation dosimeter detection system. Referring to FIG. 1, the dosimeter detection system 10 comprises a portable dosimeter detection unit 12 that is operable to connect to and obtain dose information from one or more remote dosimeter sensors 14 located in an environment or respective environments having one or more radiation sources. The dose information obtained by the detection unit 12 is sent to a computing device 16, such as a Personal Computer or equivalent, for processing, storage and display.

In a typical configuration, the dosimeter sensors 14 maybe fixed at positions within an environment to be monitored, for example different rooms within a building.

The detection unit 12 maybe provided in a standalone housing or casing having the control electronics, optical components, and other connection components mounted securely inside. In brief, the detection unit 12 is operable to extract dose information, such as instantaneous dose rate, short irradiation dose, and cumulative dose from one or multiple dosimeter sensors using OSL, OPROSL, RL, or ROSL. Each dosimeter sensor 14 comprises a phosphor-doped fluoroperovskite compound, such as but not limited to those described in the applicant's WO 2009/005377.

The detector unit 12 includes a data and control input/output interface 18 that is arranged to control the optical stimulation sources and optical detector. Data and control signals being communicated between the personal computer 16 and detector unit 12 are represented by 13. Optical stimulation sources in the form of first and second light stimulation sources 20a,20b are provided for generating stimulating light for transmission to one or more dosimeter sensors for sensing dose information in OSL, ROSL, or OPROSL modes. In one embodiment, the detector unit 12 is capable of operating in OSL, ROSL, OPROSL, or RL modes, and is switchable between these modes. The light stimulation sources 20a,20b may for example be light emitting diodes (LEDs) or laser diodes. The light stimulation sources 20a,20b generate light at one or more wavelengths with first and second wavelength ranges respectively. The stimulating wavelengths are selected based on the dosimeter compound and the type of dose information to be read-out by the detector unit, for example both instantaneous dose rate and cumulative dose. The light stimulation sources 20a,20b are driven by source driver circuitry 22, that is controlled by control signals 24 from the data and control input/output interface 18 or alternatively a manually operable user interface 26 that comprises one or more operable switches or dials for selectively operating the sources. The light stimulation sources 20a,20b may be selectively operated, one at a time, to read-out any of instantaneous dose rate, short irradiation dose, or cumulative dose from the dosimeter sensor(s). Both light sources are off when operating in RL mode. The source driver circuitry 22 may be operable to drive either or both light sources 20a,20b to generate either pulsed light or continuous light at the desired wavelength(s).

The light 28a,28b generated by the light sources 20a,20b respectively may optionally be transmitted through one or more transmission optics 30. The transmission optics 30 may be configured to alter specific properties of the stimulating light. The stimulation light from one or both light sources 20a,20b are transmitted to the desired dosimeter sensor 14 via an optical transmission medium, such as one or more optical fibre cables. The detector unit 12 comprises an optical input/output port 32 to which one or more of the dosimeter sensors 14 may be coupled via a single fibre optic cable or respective fibre optic cables 34. In one form, the dosimeter sensor(s) may be coupled to the input/output port 32 via a single bidirectional fibre optic cable that is capable of transmitting stimulation light and also receiving emitted light back from the dosimeter sensor compound(s). In such cases, an optical splitter may be provided at the input/output port or optics for splitting the fibre optic cable into the respective transmission and reception sides of the unit. By way of example, fibre optic cable 33 represents the optical transmission medium for the stimulating light transmitted to the dosimeter sensor(s) and fibre optic cable 35 represents the optical transmission medium along with the emitted light received back from the dosimeter sensor travels during dose information read-out.

On the receiver side of the detection unit 12, the emitted light from the dosimeter sensor(s) 14 during read-out is received via the fibre optical cable(s) 34 at the optical input/output port 32. The emitted light may be processed by reception optics 36 before being transmitted 38 into a optical detector 40. By way of example, the optical detector 40 may be a photomultiplier tube (PMT) that is arranged to sense the light incident on the tube and generate an indicative output light detection signals 42 representing the individual photons detected. The light detection signals 42 represent the read-out dose information stored in the dosimeter sensor(s). Detector circuitry 44 receives and processes the light detection signals 42 from the optical detector to generate a photon counting signal 46 that is output to an external device such as a personal computer 16 via the data and control input/output interface 18. The detector circuitry 44 may for example be in the form of a photon counting module that outputs a pulse signal 46 for each photon detected.

As shown, the detector unit 12 may be self-powered via power circuitry 48 with onboard battery power supply, or alternatively may be powered via data and control input/output interface 18 via a personal computer 16, or unit may be otherwise suitably powered.

By way of example, various specific implementations, configurations and operations of the radiation dosimeter detection system will now be explained by way of example only. It will be appreciated that the features, components, and functionality of these various embodiments may be combined or interchanged as desired to suit specific applications or design requirements.

2. First Embodiment

Figure 2:
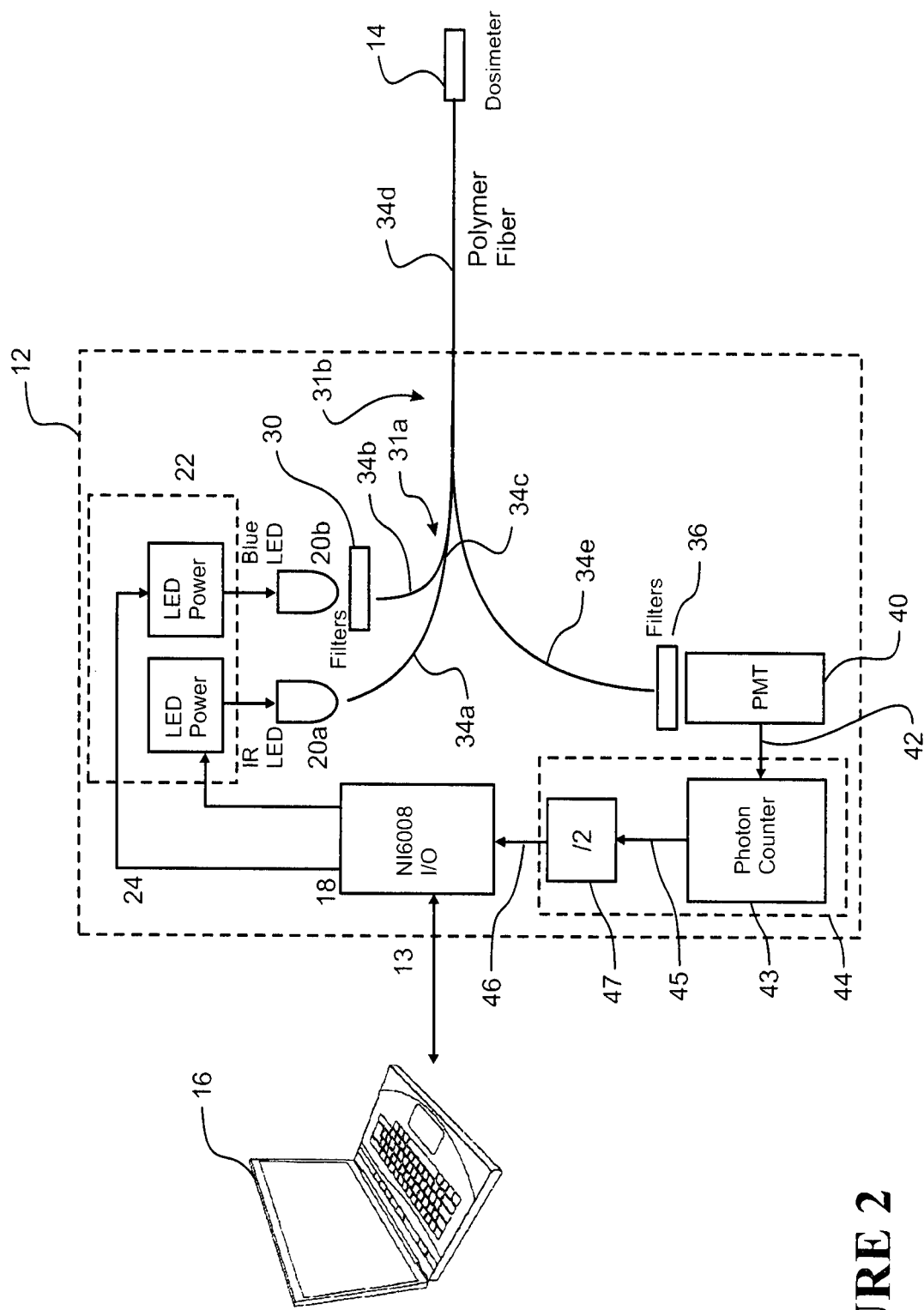
FIG. 2 shows a schematic block diagram of a first example configuration of the radiation dosimeter detection system of FIG. 1.

Detection of Instantaneous Dose Rate, Short Irradiation Dose, and Cumulative Dose Referring to FIG. 2, a first embodiment configuration of the detection system will be further explained. With reference to the overview, like components will be referenced with like numbers. In this embodiment, the detector unit 12 is operable to selectively operate either the first 20a or second light source 20b to read-out from the dosimeter sensor via OPROSL or OSL either instantaneous dose rate, short irradiation dose, or cumulative dose.

In this embodiment, the portable detector unit 12 is connected to a personal computer such as a laptop 16 via a data and control input/output interface 18, which may, by way of example only, be in the form of a USB IO device (NI6008). The data flowing back from the portable detector unit 12 and control signals from the personal computer 16 to the detector unit 12 are represented at 13 and which are communicated via a corresponding USB cable, but alternative wireless communication could be employed.

The detector unit 12 comprises a first light source 20a that is configured to generate stimulating light at wavelengths in a first wavelength range for reading-out instantaneous dose rate from the dosimeter sensor 14 during irradiation (OPROSL) or dose after irradiation (OSL). The stimulating wavelength will vary depending on the particular dosimeter sensor compound, but will be selected to be in the infrared band above approximately 750 nm, and preferably within a wavelength range between approximately 750 nm to approximately 2000 nm. By way of example, in one embodiment the first light source 28 may be an LED generating stimulating light at 940 nm. In another embodiment the first light source may be a laser diode emitting stimulating light at a wavelength in the range of between approximately 750 nm to approximately 940 nm. Typically, the source driver circuitry 22 is configured to drive the first light source, which may for example be an infrared LED, to generate pulsed infrared stimulating light at the first wavelength. The stimulating light generated by the first source is at a wavelength that is designed to deplete shallower traps in the fluoroperovskite compound, the depleted traps causing an emitted light from the sensor that represents instantaneous dose rate. In one form, the infrared stimulating light is of a longer wavelength than can be detected by the PMT 40, i.e. longer than the PMT's detection range. If the wavelength range is above approximately 750 nm, then the wavelength of the emitted light by the dosimeter sensor 14 may be between approximately 300 nm to approximately 750 nm for detection by the PMT 40. Such a configuration ensures there is no offset signal at the PMT from scattered, reflected or stray stimulating light.

The detector unit 12 also comprises a second light source 20b that is configured to generate stimulating light at wavelengths in a second wavelength range for reading-out cumulative dose from the dosimeter sensor 14. The stimulating wavelength will vary depending on the particular dosimeter sensor compound, but will be selected to be in the ultraviolet (UV) to visible band/region and in the range of approximately 280 nm to approximately 600 nm. By way of example, in one embodiment the second light source may be an LED emitting stimulating light at 505 nm. In another embodiment, the second light source may be a fibre-coupled LED emitting a stimulating light at 470 nm. In another embodiment, the second light source may be a fibre-coupled laser diode configured to emit stimulating light at a wavelength of 405 nm. Typically, the source driver circuitry 22 is configured to drive the second light source, which may for example be a blue LED, to generate continuous stimulating light for reading out the cumulative dose. The stimulating light generated by the second source is at a wavelength that is designed to deplete deeper traps in the fluoroperovskite compound, the depleted traps causing an emitted light from the sensor that represents cumulative dose stored in the sensor. Read-out of the cumulative dose with the second light source also causes bleaching or resetting to zero of the stored dose information in the sensor. Typically, the second light source 20b is operated to read-out the cumulative dose after one or multiple read-outs of the instantaneous dose rate with the first light source 20a. Additionally, the cumulative dose can be read-out after a series of radiation doses at different times. By way of example only, the stimulation wavelengths are in the range where the resultant dark decay is greater than 5 days.

In brief, with this dual-light-source configuration, it is possible to read-out both instantaneous dose rate and the dose during short irradiations from the dosimeter sensor via infrared stimulation or alternatively the cumulative dose can be read out at any time via blue stimulation. This capability is enabled by the fluoroperovskite compound in the dosimeter sensor which has a carrier trap distribution where some of the traps can be depleted by infrared stimulation and all of the traps can be depleted by blue stimulation.

As shown, the stimulating light from the light sources 20a, 20b is optically coupled via coupling optics into respective first 34a and second 34b fibre optic cable portions which are joined by a first splitter 31a into the same transmission fibre optic cable 34c. The coupling optics may comprise a lens or lenses for focusing the stimulating light into the cables and/or optical filters. For example, a filter or filters 30 may be provided at the coupling of the blue LED source 20b into the fibre optic cable 34a. The filter may be in the form of a band-pass or long-pass filter that is designed to remove light in the range that will be emitted by the dosimeter 14. The transmission fibre optic cable 34c is then joined by a second optical splitter 31b with a reception fibre optic cable 34e into the main fibre optic cable 34d that couples the detector unit 12 with the dosimeter sensor 14.

While the light sources 20a, 20b are shown as LEDs, it will be appreciated that other light sources could alternatively be used if desired. For example, in an alternative arrangement the infrared LED 20a may be replaced with a small laser diode with a wavelength greater than approximately 800 nm. Such a configuration may offer better light coupling to the optical fibre 34a and reduce the read-out time from the dosimeter sensor.

As will be appreciated, in the OSL and OPROSL modes the dosimeter compound in the dosimeter sensor 14, in response to stimulating light from one of the light sources 20a, 20b, generates an emission light representing the dose information stored in the dosimeter sensor or the dose rate as a result of its exposure in the environment to ionizing radiation of some type. The emitted light is transmitted back along the main fibre optic cable 34 and into the reception portion 34e of the cable and after the second splitter 31b.

The reception portion 34e of the fibre optic cable is coupled into the light detector, such as a photomultiplier tube 40 (PMT), via an optical filter or filters 36. In this configuration, the optical filter 36 is a short-pass or band-pass (e.g. U340) filter that is designed to stop any of the stimulating light from 20b from being detected by PMT 40, which can lead to an offset signal and additional noise that affects the minimum detectable dose and the reproducibility. Stray light from the infrared light source 20a is not a problem in this respect as the photon counting PMT (e.g. H5773) is not sensitive to light with a wavelength above approximately 650 nm.

As previously mentioned, the PMT 40 is arranged to sense the emitted light incident on the tube and generate an indicative output light detection signals 42 representing the individual photons detected. The light detection signals 42 represent the read-out dose information stored in the dosimeter sensor(s). In this embodiment, the detector circuitry 44 connected to the PMT 40 comprises a photon counter module 43 (e.g. Hamamatsu 09744) that processes the light detection signals 42 of the PMT 40 and outputs a 10 ns TTL pulse signal 45 for each photon detected. This pulse signal 45 may then be either passed directly to the data and control input/output interface 18 for output to the laptop or PC 16 for processing and conversion of the photon count information into dose information or optionally first passed through a pulse stretching module 47 that is arranged to stretch or increase the width of the pulses of the pulse signal 45 and output a modified pulse signal 46 for easier detection and processing by the input/output interface 18. In this embodiment, it is only necessary to detect up to $10^6$ counts per second and hence the average time between photon counts is ~1000 ns. The pulse stretching module may be in the form of a ripple counter module 47 with its /2 output effectively stretching out the 10 ns pulse to, on average, ~1000 ns. This allows the use of a count input port on a relatively low cost USB I/O device (NI6008) 18 to be used that has a minimum count pulse width of 100 ns. Alternatively, it will be appreciated that the conventional method for photon count detection with a fast photon counting board in a PC could be used and these typically require a bandwidth of at least 100 MHz.

Any of the fluoroperovskite compounds may be used in the dosimeter sensor 14, but in some embodiments the following compounds may provide particular benefits: $NaMgF_3:Eu^{2+}$, $RbMgF_3:Eu^{2+}$, and $NaMgF_3:Mn^{2+}$. They have been selected because $NaMgF_3:Eu^2$ is nearly tissue equivalent and it has effective atomic number, $Z_{\mathit{eff}}$, of 13.63 for 0.1% $Eu^{2+}$. The effective atomic number is defined as $Z_{\mathit{eff}}=(\Sigma n_i Z_i^4/\Sigma n_i Z_i)$ where $n_i$ is the molar fraction and $Z_i$ is the atomic fraction of each i-th constituent. The effective atomic number is 7.62 for tissue, 8.34 for LiF, and 11.43 for $Al_2O_3$:C. Thus, a $Z_{\mathit{eff}}$ close to 7.62 is desirable. $RbMgF_3$:0.2% $Eu^{2+}$ has a $Z_{\mathit{eff}}$ of 31.56 and hence it is not tissue equivalent but the number of photons per Sv is at least 10 times greater than that of $NaMgF_3$:0.1% $Eu^{2+}$. Note that the dose over-response when compared with tissue of $RbMgF_3$:0.2% $Eu^{2+}$ is only significant below 200 keV and hence $RbMgF_3$:0.2% $Eu^{2+}$ can be used as a nearly tissue equivalent and high sensitivity dosimeter above 200 keV. $NaMgF_3$:$Mn^2$ is even more tissue equivalent than $RbMgF_3$:$Eu^{2+}$. It also has the advantage that the Cherenkov radiation background is lower than that of $RbMgF_3$:$Eu^{2+}$. $Z_{\mathit{eff}}$ is 10.8 for $NaMgF_3$:0.1% $Mn^{2+}$.

3. Second Embodiment

Dose Rate Monitoring by Dose Independent Radioluminescence

In this embodiment, the detection system employs the same hardware configuration as that described for the first embodiment. However, the system is configured to run in RL and ROSL modes, or is switched to run in these modes if the system is provided multi-mode capability for OSL, OPROSL, ROSL and RL mode dose information sensing.

In this embodiment, the detection system is configured for reading-out instantaneous or real-time dose rate from the dosimeter sensor 14 during its irradiation in the environment using RL and ROSL. In this embodiment, a light source, such as the second light source 20b, is configured to generate stimulating light at a wavelength or wavelengths in the range of approximately 300 nm to approximately 600 nm. In a preferred embodiment, the light source is configured to emit stimulating light at a wavelength in the range of approximately 400 nm to approximately 600 nm, even more preferably approximately 400 nm to approximately 530 nm, even more preferably approximately 400 nm to approximately 480 nm, and even more preferably approximately 405 nm to approximately 470 nm. During detection at high doses (e.g. in the range of 0.1 Sv to 1000 Sv), the light source(s) is operated to continuously stimulate or illuminate the dosimeter sensor 14 with the stimulating light, while the optical detector 40 senses the emitted light from the dosimeter sensor generated by the ROSL mode as further explained below. At lower doses (e.g. below 0.1 Sv), the emitted light is detected from the dosimeter in the absence of any stimulating light (i.e. the light source(s) are not activated) and operates in RL mode.

It is known that radioluminescence occurs when some dosimeter compounds are exposed to ionising radiation. The applicants have discovered that fluoroperovskite compounds display a dose independent emitted light intensity (ROSL) when continually exposed to stimulating light for higher doses. This means that radioluminescence represented by the emitted light intensity detected by optical detector 40 can be used to measure the real-time dose rate, i.e. the light detection signals 42 represent the real-time dose rate. Therefore, this embodiment exploits the ability to continually optically excite the dosimeter compound during irradiation and use the resultant emitted light intensity as a measure of the radiation dose rate. For lower doses, the RL emitted light intensity is approximately dose independent in the absence of any stimulating light and also represents dose rate.

By way of example, the applicants have also found that the radioluminescence from $NaMgF_3$:$Eu^{2+}$ is surprisingly high, which means that we can measure radiation dose rates to low dose rates in a nearly tissue equivalent dosimeter (e.g. $Z_{\mathit{eff}}$=13.63). A $Z_{\mathit{eff}}$ of 10.81 can be achieved by using $NaMgF_3$:0.1% $Mn^{2+}$ that is even better than that found in $Al_2O_3$:C (11.43). It should be noted that $Al_2O_3$:C is not a very good RL dosimeter. Furthermore, the radioluminescence intensity from $CsCdF_3$:$Mn^{2+}$ is more than 10 times greater than that from $RbMgF_3$:$Eu^{2+}$. These particular compounds are examples of some of the fluoroperovskite compounds that may be employed in the dosimeter sensor 14 of this embodiment.

It will be appreciated that either or both of the light sources 20a, 20b may be configured to generate the intensity of stimulating light at the wavelength required for this ROSL mode embodiment.

4. Experimental Examples

First and Second Embodiments

By way of further explanation only, the following discusses results from experimental examples of the first and second embodiments. The techniques, capabilities and ranges described in the explanation are not intended to be limiting, but are provided by way of further example of the system.

Experiment 1

4.1 Overview

In this experiment we discuss the results from OSL, OPROSL, and RL measurements on a portable fibre optic dosimeter sensor that incorporates $RbMgF_3$:$Eu^{2+}$ attached to the end of a multimode polymer optical fiber and where the dose information in the sensor is detected by a customised detector unit. We observe radioluminescence (RL) during gamma ray irradiation and show that the low-dose RL increases linearly with increasing dose rate where the minimum detectible dose rate is 0.015 μSv/s. We show that OPROSL by pulsed infrared-stimulation (940 nm) can be used to generate infrared stimulated optically stimulated luminescence (IROSL) that can be used for real time dose monitoring. The cumulative dose can be read-out after irradiation where a linear OSL dose response was observed when stimulating at 505 nm and the sensitivity is 30 μSv.

4.2 Experiment

The $RbMgF_3$:0.2% $Eu^{2+}$ sample was transparent and x-ray diffraction measurements showed that it was single phase with large crystallites. A 2×2×5 mm transparent piece was cut from a sample and attached to the end of a 1 mm diameter multimode PMMA optical fiber with the use of superglue. The $Eu^{2+}$ OSL emission peaks at 359 nm and the OSL can be stimulated by ultraviolet to near infrared light. Similar transparent $NaMgF_3$:0.1% $Eu^{2+}$, $RbMgF_3$:0.2% $Eu^{2+}$, $RbMgF_3$: 1% $Mn^{2+}$, and $CsCdF_3$:0.2% $Mn^{2+}$ polycrystalline and single crystal samples were attached to PMMA optical fibers. The OSL emission from the $Mn^{2+}$ doped samples is peaked at ~550 nm.

Radiation measurements were made using a $^{241}$Am source (60 keV γ-rays). The shallow dose equivalent (Hp(0.07)) was determined for a short exposure using TLD-100 discs that were processed to readout the dose via thermoluminescence by the New Zealand National Radiation Laboratory.

A schematic of the fiber-optic dosimeter system that we have developed is shown in FIG. 2. Two pulsed light emitting diodes (LEDs) were used for visible (505 nm) or infrared (940 nm) stimulated OSL measurements during or after irradiation. They were operated in continuous mode for readout after irradiation. Radioluminescence (RL) and OSL were detected using a small H5783P photomultiplier tube (PMT) and a C9744 photon counter (10 ns pulse per photon count). This was connected to a module containing a 74HC4040N ripple counter that was connected to a National Instruments USB-6008 input/output module. The ripple counter allowed us to effectively broaden the pulse width from the photon counter so that it could be read by the USB-6008 module that has a counter input bandwidth of 5 MHz. It was used in a divide-by-two configuration and the lost count rate was negligible for count rates below $10^6$ counts/s. This pulse counting configuration was useful as it provided a portable fiber-optic dosimeter that could be connected to a laptop computer and powered by an external 18V portable laptop battery pack. A control programme was written using LabView and the count rate was recorded every second. The LEDs were controlled by using the USB-6008 USB digital output lines and simple LED power modules. Characterization measurements were also made by directly illuminating the $RbMgF_3$:$Eu^{2+}$ sample at 532 nm using a 5 W diode pumped solid state frequency doubled Nd:$YVO_4$ laser.

4.3 Results

In relation to the second embodiment, FIG. 3A shows a plot of the RL (25 s to 1923 s) followed by OSL (>1925 s) after irradiation. The sample was stimulated with a 505 nm LED. The sample was exposed to an $^{241}$Am dose rate of 10.5 µSv/s from 25 s to 1923 s. A 495 nm long pass filter was used after the LED and two UG11 filters were used before the PMT. The total dose was 19.9 mSv. The OSL was detected during continual stimulation with a 7 W 505 nm LED. The OSL was bleached after 10 minutes and the remaining signal is due to stimulating light that is not be completely blocked by the filters. Thus, RL can be used to monitor the dose rate during irradiation and the peak or integrated OSL can be used to monitor the cumulative dose.

FIG. 3B shows a plot of the OSL decay after a low $^{241}$Am dose of 300 µSv. The dashed curve is a fit to the data using 2 exponentials. We estimate the minimum detectible dose to be 30 µSv.

The minimum detectable dose rate when the RL is monitored can be estimated from FIG. 3C where the dose rate was 0.015 µSv/s from 0 to 70 s and then the $^{241}$Am source was removed. The sample was initially bleached at 505 nm. This shows that the minimum detectible dose rate is approximately 0.015 µSv/s. The horizontal lines indicate the average count rates.

Figure 3E:
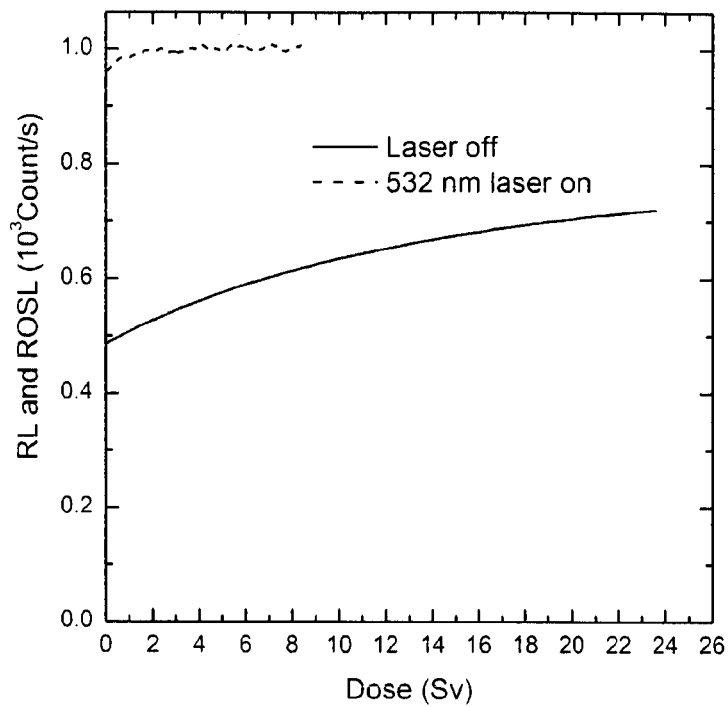
FIG. 3e shows a plot of emitted light intensity from the fluoroperovskite sample during irradiation at 0.4 mSv/s without laser stimulation (RL, solid curve) and during continual laser stimulation at 532 nm (ROSL, dashed curve)

It can be seen in FIG. 3A that the RL is independent of time for low doses. However, it is apparent in FIG. 3D that this is not the case for high doses where a $^{241}$Am dose rate of 0.73 mSv/s was used. The RL increases and starts to saturate at high doses. This may be attributed to a competition between electron-hole recombination and electron trapping. Initially the RL intensity is low because some of the electrons in the conduction band become trapped in the electron traps. Continual irradiation eventually leads to filling of the available electron traps and hence a saturation of the RL. However, we have found that it is possible to obtain a substantially time-independent luminescence for high doses by continual illumination of the sample with laser light at 532 nm. We used a dose rate of 0.4 mSv/s and an optical intensity of 23 mW/mm² and found that the detected signal is nearly independent of dose for doses as high at 8 Sv. The results can be seen in FIG. 3E where the luminescence is plotted without laser stimulation (RL, solid curve) and during continual laser stimulation (ROSL, dashed curve). We have developed a model to explain this behaviour. It includes rapid electron-hole recombination at the luminescent ion as well as electron and hole trapping. In the absence of stimulating light some of the electrons become trapped and this results in an initially lower signal. The signal increases as the available electron trapped become filled and for very high doses (much greater than 30 Sv) the available traps will all be filled and the signal will then be independent of the dose. Stimulating with intense laser light leads to significant electron detrapping and a signal that is independent of the dose.

In relation to the first embodiment, $RbMgF_3$:$Eu^{2+}$ has infrared stimulable OSL that arises from electrons in shallow traps where the dark decay at room temperature is ~50% in 5 days, while the dark decay time for the remaining traps is much greater than 5 days. The appearance of infrared stimulable traps in $RbMgF_3$:$Eu^{2+}$ allows us to use infrared stimulated OPROSL during irradiation to continually monitor the dose rate followed by intense infrared bleaching. Blue or green stimulation can then be used at any time after irradiation to readout the cumulative dose.

Figure 4:
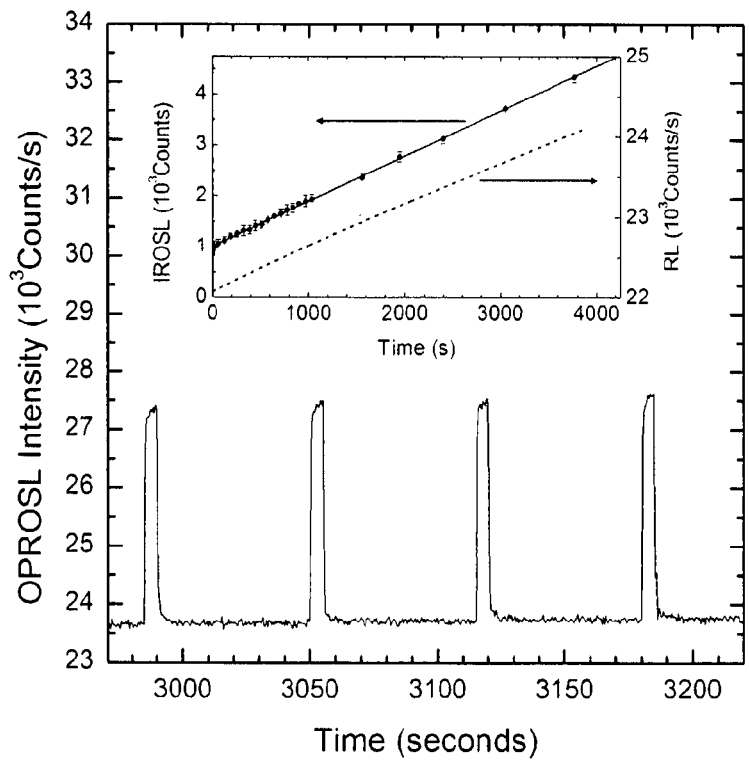
FIG. 4 shows a plot of the OPROSL emitted light intensity from the fluoroperovskite sample for a dose rate of 200 µSv/s and during pulsed infrared stimulation, and for this experiment the OPROSL signal can be also be separated into an infrared stimulated OSL (IROSL) and RL signal as shown in the inset.

FIG. 4 shows a plot of the infrared stimulated OPROSL when using short 940 nm read pulses. The dose rate was estimated to be approximately 200 µSv/s. The inset plot is of the resultant IROSL (filled circles—left axis) against time. The solid line is a linear fit to the data. The IROSL is linear in time and hence dose. Thus, pulsed infrared stimulation during irradiation can be used for real-time dose rate monitoring. Also shown is a cubic polynomial fit to the RL when the stimulating light was off (dashed curve, right axis). More particularly FIG. 4 shows part of the luminescence during ~200 µSv/s irradiation and with pulsed stimulation using a 0.88 W 940 nm LED. There is no background from stimulation light because the PMT is not sensitive to the light emitted by the 940 nm LED. Over this small time-span the RL appears to be independent of time. This is clearly not the case for longer time-spans as can be seen in the inset plot (dashed curve, right axis) where the total additional dose was estimated to be 800 mSv.

Figure 5A:
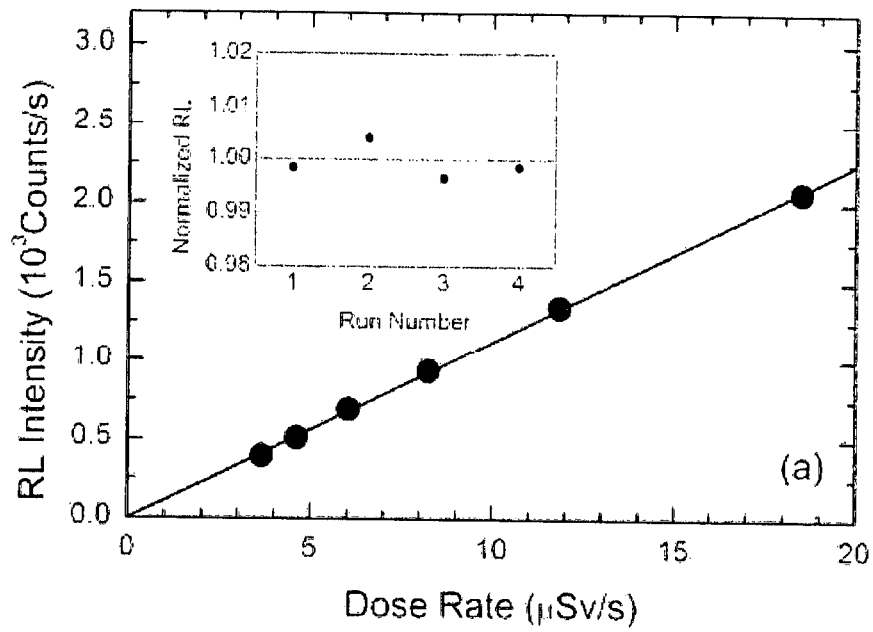
FIG. 5a shows a plot of the initial RL emitted light intensity against the dose rate, with inset showing a plot of normalised initial RL for different runs and with a dose rate of 10.5 µSv/s.
Figure 5B:
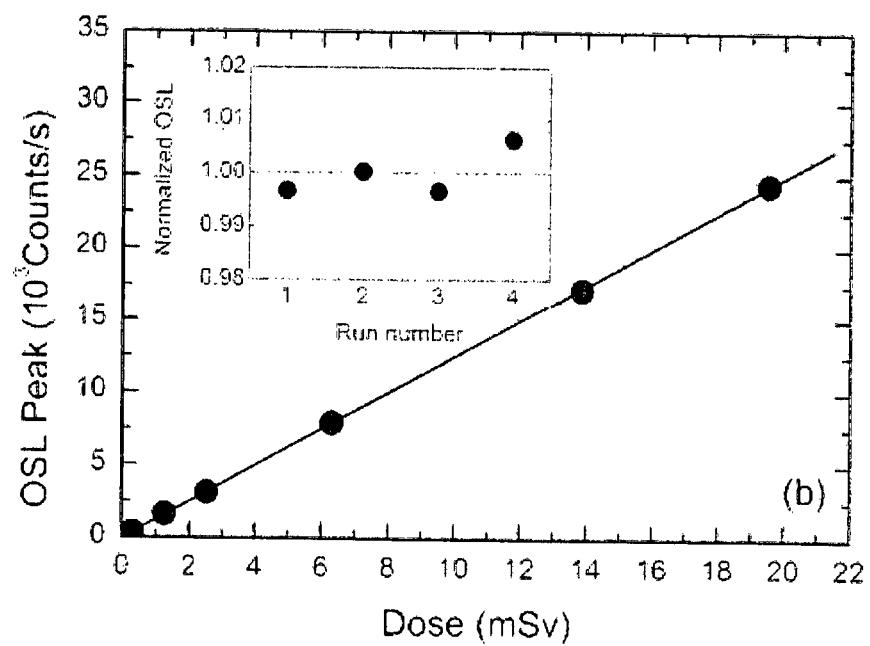
FIG. 5b shows a plot of the peak OSL emitted light intensity against the dose where the OSL was detected after irradiation, with inset showing a plot of the integrated OSL intensity for different runs and with a dose of 3.41 mSv.

Referring to FIG. 5A, we show that the initial RL intensity is linear with the dose rate where the total dose was less than 20 mSv. The reproducibility is excellent (within 0.5% variation) as can be seen in the inset to FIG. 5A which shows the normalized initial RL for different runs and with a dose rate of 10.5 µSv/s. The sample was optically bleached between measurements. The cumulative dose after irradiation was obtained by measuring the OSL intensity during bleaching with the 505 nm LED. The resultant peak initial OSL intensity is plotted in FIG. 5B for different doses after subtracting the background signal. The OSL intensity is linear in this dose range (up to ~16 mSv). The inset to FIG. 5B shows the integrated OSL intensity after repeated doses of 3.41 mSv for different runs. The resultant reproducibility is better than 1%.

It should be noted that there is a background dose from $^{87}$Rb (27.87% natural isotopic abundance). We estimated the self-dose in RbMgF$_3$:Eu$^{2+}$ by fully bleaching the sample and, then waiting for 64 hours. The OSL was readout and FIG. 5B was used to estimate the equivalent 60 keV γ-ray dose. We find that it corresponds to 0.0094 μSv/s (0.81 mSv/day) and contributes ~1 count/s to the detected signal. Thus, the self-dose will need to be subtracted from the recorded dose when doses are monitored at low dose rates for extended periods.

Figure 6A:
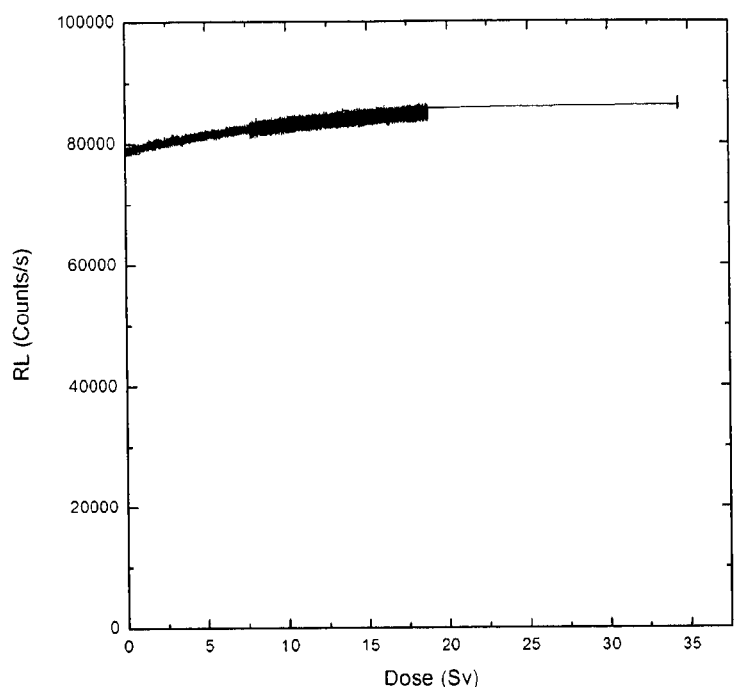
FIG. 6a shows a plot of RL emitted light intensity from $NaMgF_3:0.1\%\ Eu^{2+}$ for a dose rate of 0.73 Sv/s and without filters before the PMT (36 in FIG. 2)

RL measurements have been done on other fluoroperovskites and after removing the filter 36 in FIG. 2. For example, the RL from NaMgF$_3$:0.1% Eu$^{2+}$ is plotted in FIG. 6A for a dose rate of 0.73 Sv/s. The break in the data is because the unit was turned off and then turned on again when a high dose had been reached. It can be seen that the dose dependence is much less than that found in RbMgF$_3$:0.2% Eu$^{2+}$, which is advantageous.

Figure 6B:
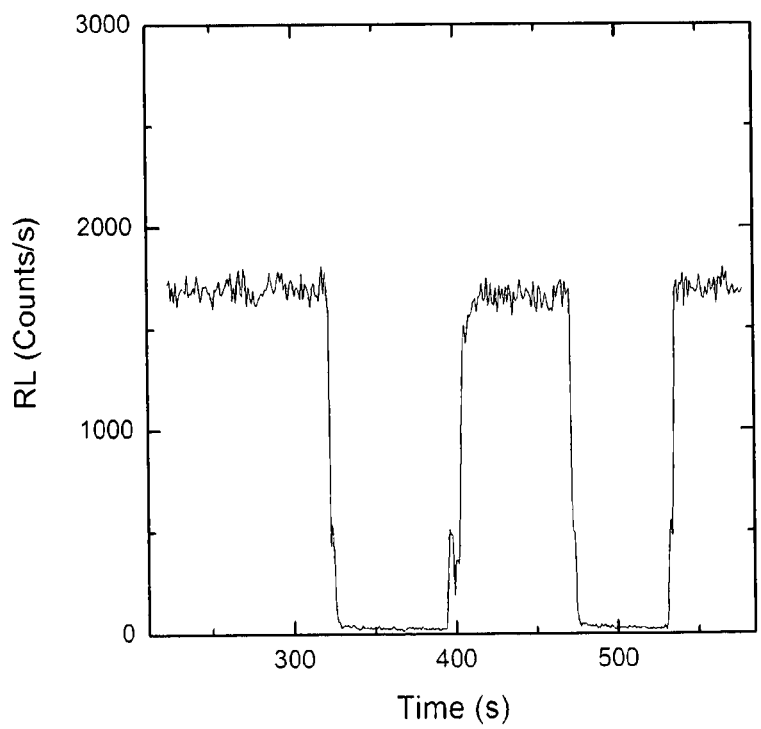
FIG. 6b shows a plot of RL emitted light intensity from $NaMgF_3:0.1\%\ Eu^{2+}$ for a dose rate of 4/1 Sv/s and without filters before the PMT (36 in FIG. 2)
Figure 6C:
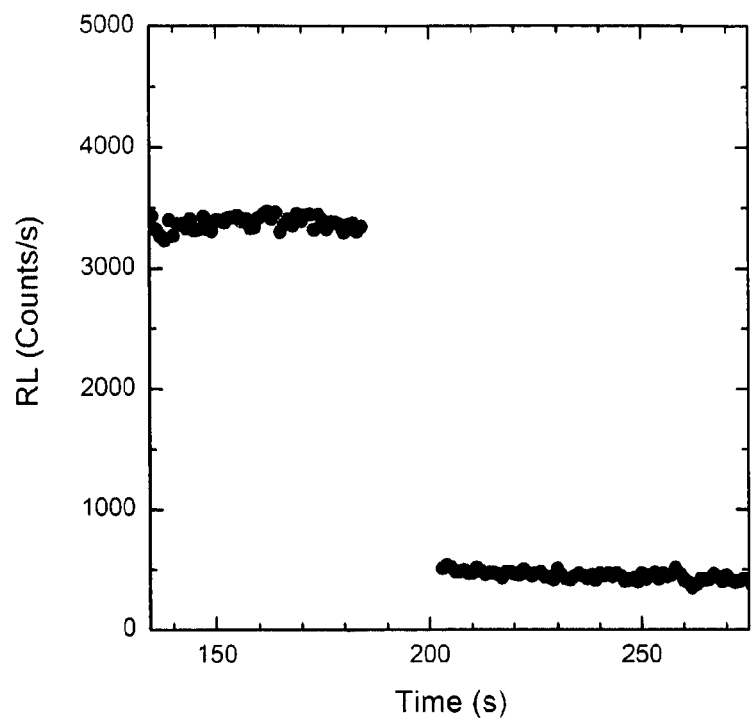
FIG. 6c shows a plot of RL emitted light intensity from $RbMgF_3:0.2\%\ Eu^{2+}$ for a dose rate of 4 µSv/s and without filters before the PMT (36 in FIG. 2)
Figure 6D:
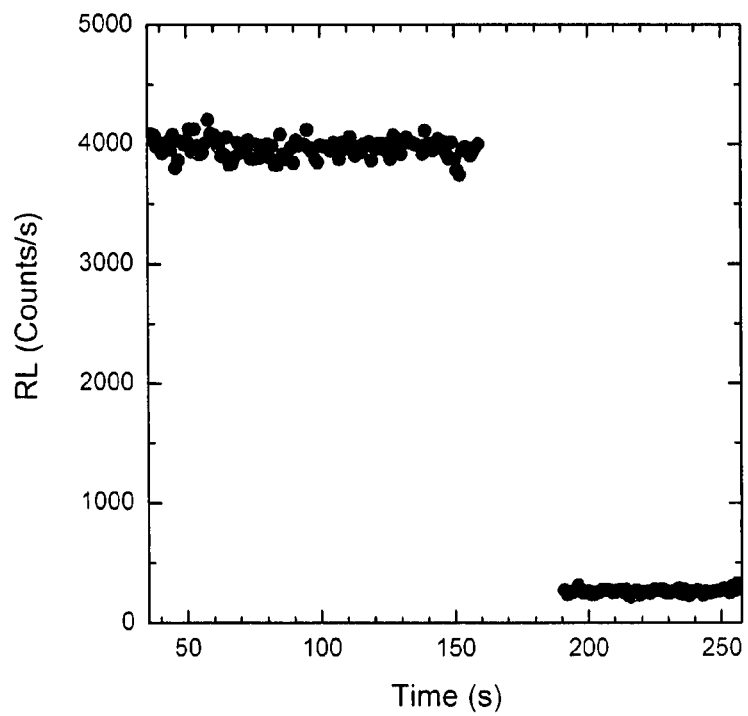
FIG. 6d shows a plot of RL emitted light intensity from $RbCdF_3:1\%\ Mn^{2+}$ for a dose rate of 4 µSv/s and without filters before the PMT (36 in FIG. 2)
Figure 6E:
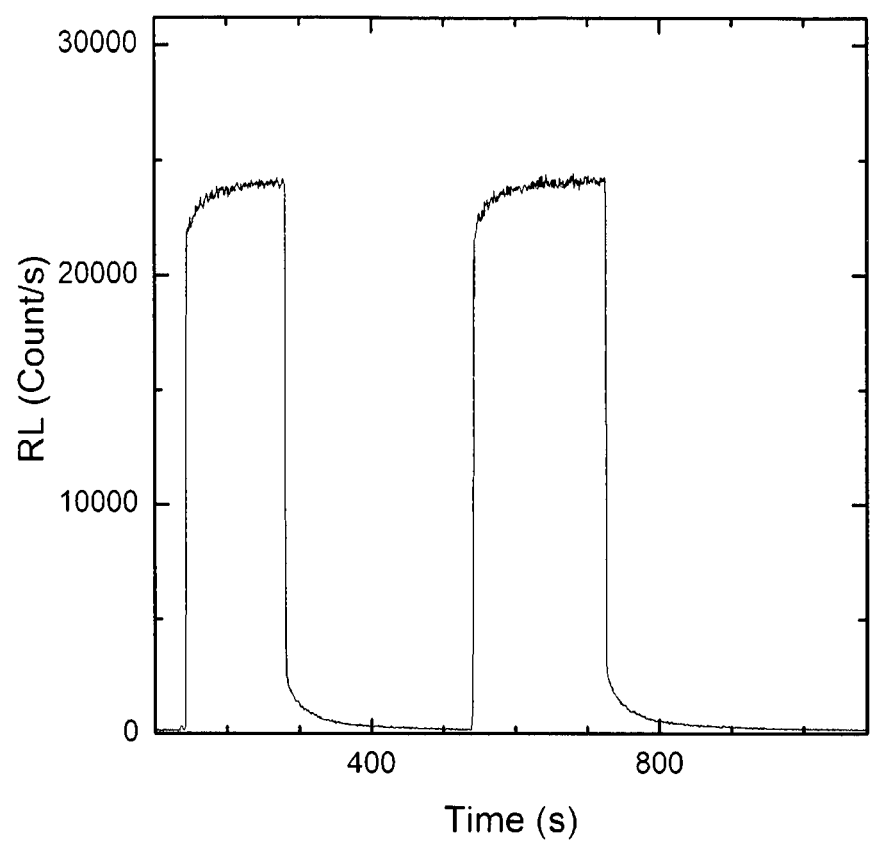
FIG. 6e shows a plot of RL emitted light intensity from $CsCdF_3:0.2\%\ Mn^{2+}$ for a dose rate of 4 µSv/s and without filters before the PMT (36 in FIG. 2)

RL measurements were also done on NaMgF$_3$:0.1% Eu$^{2+}$ (FIG. 6B), RbMgF$_3$:0.2% Eu$^{2+}$ (FIG. 6C), RbCdF$_3$:1% Mn$^{2+}$ (FIG. 6D), and CsCdF$_3$:0.2% Mn$^{2+}$ (FIG. 6E) where the dose rate was 4 μSv/s. FIG. 6B shows the RL from NaMgF$_3$:0.1% Eu$^{2+}$ when the $^{241}$Am source was added and then removed 2 times. FIGS. 6C and 6D shows the RL from RbMgF$_3$:0.2% Eu$^{2+}$ and RbCdF$_3$:1% Mn$^{2+}$ respectively when the $^{241}$Am was added and then removed. The background signal is from stray light incident on the sample from the room and it can be removed by better light shielding of the sample. FIG. 6E shows the RL from CsCdF$_3$:0.2% Mn$^{2+}$ and the pulses are when the $^{241}$Am was added. This sample shows an initial rise when the $^{241}$Am was added and a decay when the source was removed. These can be removed by continual illumination with visible light. The results are summarized in the table below after normalizing to the RbMgF$_3$:0.2% Eu$^{2+}$ RL signal.

| Sample | Relative RL signal |
| --- | --- |
| NaMgF$_3$: 0.1% Eu$^{2+}$ | 0.57 |
| RbMgF$_3$: 0.2% Eu$^{2+}$ | 1 |
| RbCdF$_3$: 1% Mn$^{2+}$ | 1.27 |
| CsCdF$_3$: 0.2% Mn$^{2+}$ | 8.16 |

Thus, although the OSL signal from NaMgF$_3$:0.1% Eu$^{2+}$ is at least 10 times less than that from RbMgF$_3$:0.2% Eu$^{2+}$ we find that the RL signal is 57%, which is good for a nearly tissue equivalent RL dosimeter. The RL signal from CsCdF$_3$:0.2% Mn$^{2+}$ is more than 8 times that from RbCdF$_3$:1% Mn$^{2+}$ and hence CsCdF$_3$:0.2% Mn$^{2+}$ is a good RL dosimeter for non-tissue equivalent applications especially when the dose is recorded during continual simulation with visible light.

In summary, this experiment shows that RbMgF$_3$:Eu$^{2+}$ has potential as a RL, OSL, ROSL, and OPROSL fiber-optic dosimeter material and it is possible to detect doses down to 30 μSv and dose rates to 0.015 μSv/s using a portable detector system set-up. The unique trap distribution in this compound allows us to use infrared stimulated OSL to monitor the instantaneous dose rate during irradiation and at a stimulation wavelength that is beyond the detection range of the PMT and hence no optical filters are required. The cumulative dose can be readout at any time by OSL and stimulating at 505 nm. We also have shown that a range of other fluoroperovskites can be used for RL dosimeter applications.

Experiment 2

4.4 Overview

In this experiment we discuss the results from RL measurements on a portable fibre optic dosimeter sensor that incorporates small volume RbMgF$_3$:Eu$^{2+}$, RbMgF$_3$:Mn$^{2+}$, NaMgF$_3$:Eu$^{2+}$, and NaMgF$_3$:Mn$^{2+}$ attached to the end of a multimode polymer optical fibre and where the dose information in the sensor is detected by a customised detector unit. The measurements were done in a high energy photon beam from a clinical linear accelerator operating at 6 MV and designed for the radiation treatment of cancer (e.g. prostate cancer). This study is motivated by the need to accurately verify and validate the 3D radiation treatment plans before they are delivered to the patient. This has now become an important problem because more complex 3D radiation doses are now possible with the new volumetric modulated arc radiotherapy doses that can be delivered by structuring the x-ray beam and rotating the x-ray source. This now requires small volume (<~1 mm$^3$) radiation dosimeters that are close to being tissue equivalent. Initial measurements show that the RL and integrated RL are linear with dose in the clinical dose regime of up to 10 Gy. The initial energy response measurements on NaMgF$_3$:Eu$^{2+}$ and NaMgF$_3$:Mn$^{2+}$ are also encouraging.

4.5 Experiment

The RbMgF$_3$:0.2% Eu$^{2+}$, RbMgF$_3$:0.2% Mn$^{2+}$, NaMgF$_3$:0.05% Eu$^{2+}$, and NaMgF$_3$:1% Mn$^{2+}$ samples were transparent and x-ray diffraction measurements showed that they were single phase with large crystallites. A 1 mm$^3$ transparent piece was cut from each sample and attached to the end of a 1 mm diameter multimode PMMA optical fibre with the use of 5 minute epoxy. The sample was then sealed using heat shrink and black paint. The PMMA optical fibre was ~1 m long and it was coupled to a 20 m length of 0.6 mm diameter silica fibre. The silica fibre was used because the optical losses are low in the Eu$^{2+}$ and Mn$^{2+}$ RL wavelength ranges. The 20 m length was used so that the dose rate and dose could be safely monitored in another room and away from the x-ray source. The silica optical fibre was connected to the customised detector unit. The Eu$^{2+}$ line emission peaks at ~360 nm and the Mn$^{2+}$ emission is peaked at ~580 nm for RbMgF$_3$:Mn$^2$ and ~600 nm for NaMgF$_3$:Mn$^{2+}$. A U360 filter was placed in front of the PMT for Eu$^{2+}$ samples and a 590 band pass filter was placed in front of the PMT for Mn$^{2+}$ samples. Optical filters were used because high energy photons can also result in Cherenkov radiation also known as the "stem effect" where the Cherenkov radiation intensity increases strongly with decreasing wavelength. This also partly explains the use of Mn$^{2+}$ where the emission is at a longer wavelength and hence the background Cherenkov radiation intensity is less. Note that it is also possible to use another luminescent ion (e.g. Er$^{3+}$) that will shift the emission to the infrared and where Cherenkov radiation is unlikely to be a problem. The samples were predosed to the kGy level using a high dose rate 192Ir brachytherapy source (several kGy/hour) to remove the dependence of the RL on the dose. The sample was then placed inside a plastic phantom and exposed to x-rays from the clinical linear accelerator operating at 6 MV. The dose rate was set to 1 to 6 Gy/min and the absorbed dose from 1 to 10 Gy. Measurements were done on a blank fibre to measure the Cherenkov radiation that was then subtracted from the sample signal. The energy dependence was characterized by measuring the tissue phantom ratio where the sample was placed at 30 cm in water and was referenced to the detector at 5 cm in water.

4.6 Results

Figure 7A:
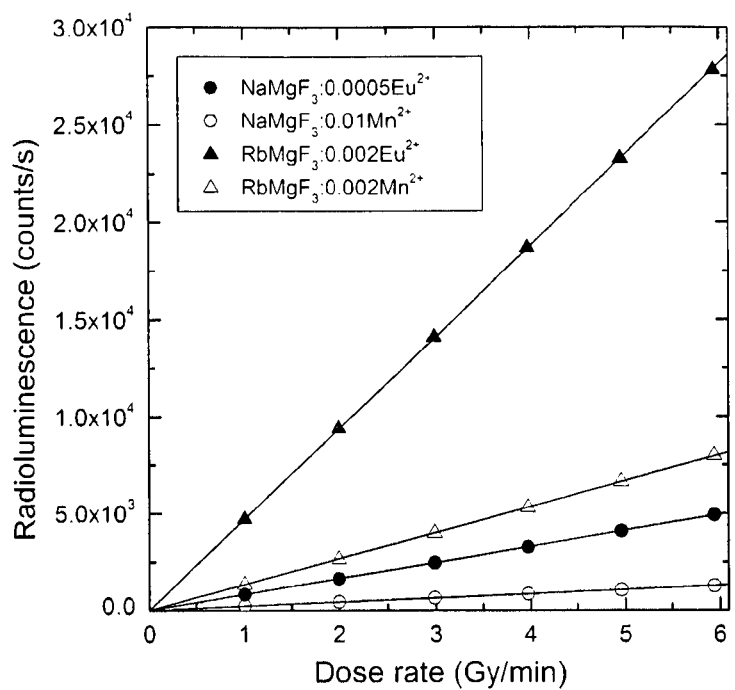
FIG. 7a shows a plot of experimental results of radioluminescence against dose rate for 4 different fluoroperovskite compounds exposed to x-rays from a linear accelerator operating at 6 MV.
Figure 7B:
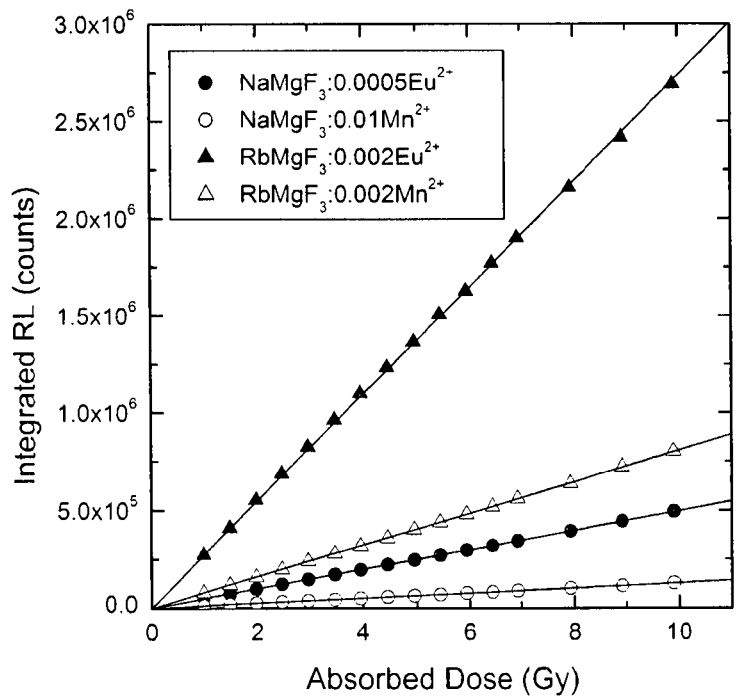
Figure 7C:
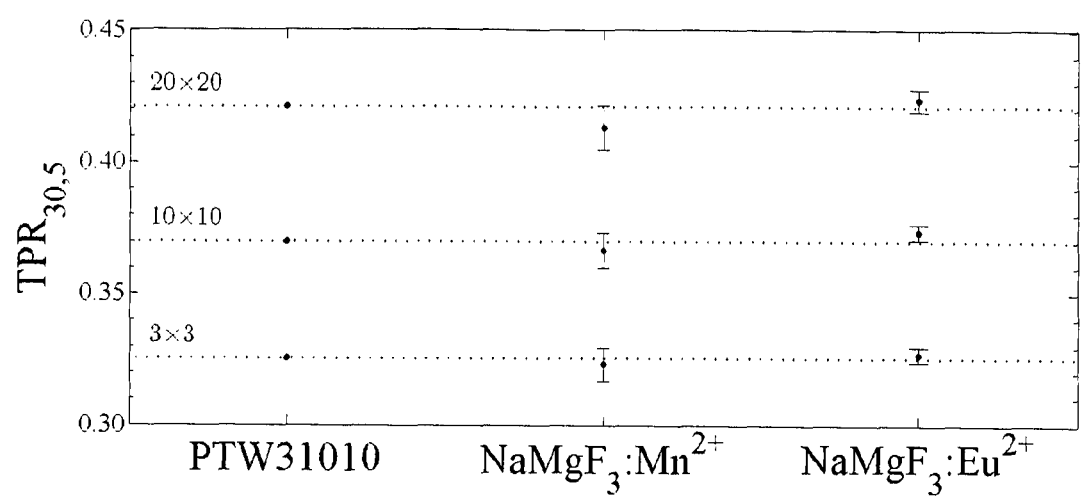
FIG. 7c shows a plot of the tissue phantom ratio at 30 cm with reference at 5 cm in water, $TPR_{30,5}$, for $NaMgF_3:Mn^{2+}$, $NaMgF_3:Eu^{2+}$, and PTW31010 for different sized radiation fields.

FIG. 7a shows the RL plotted against the dose rate (dose rate response in 6 MV). The lines are linear best fits and shows that there is a linear RL response with increasing dose rates. FIG. 7b shows the integrated RL signal plotted against the absorbed dose (absorbed dose response in 6 MV). The lines are linear best fits and shows that the integrated RL can be used to measure to total dose. FIG. 7c is the tissue phantom ratio, $TPR_{30,5}$, for radiation fields of $3\times3$ cm$^2$, $10\times10$ cm$^2$, and $20\times20$ cm$^2$, and for $NaMgF_3:Mn^{2+}$ and $NaMgF_3:Eu^{2+}$ as well as for the standard calibration ionization chamber detector (PTW31010). The results show values that are the same as that from the ionization chamber detector within the experimental uncertainty. Thus, these 2 compounds have a promising energy response for radiation therapy dose verification and validation.

5. Example Detector System Applications

The portable fibre optic dosimeter detection system may be employed in any application requiring the remote monitoring of radiation doses in an environment. Such applications may include, but are not limited to, environmental monitoring (e.g. in nuclear reactors and storage facilities), security (e.g. the illegal transportation of radioactive materials), non-destructive testing, and monitoring the dose during and after radiotherapy.

6. Summary of Different Detection Modes

As explained above, the portable fibre optic dosimeter detection system may be operated and/or configured to operate in a number of different modes as will be further briefly summarised in the following. Total cumulative dose readout is typically provided by blue light stimulated OSL mode with the option of IR pre-cleaning of the dosimeter. This mode will also preset the dosimeter sensor. Latest (short irradiation) dose readout may be provided by IR light stimulated OSL mode. This mode is for when there is a series of irradiations and the dose from each irradiation can be read in this mode. Pulsed dose rate monitoring is provided by IR light stimulated pulsed OSL (OPROSL mode). Typically in this mode there is no need for a detector filter. Continual low dose rate monitoring is typically provided by radioluminescence (RL) mode. Continual high dose rate monitoring is typically provided by radioluminescence and blue light stimulation (ROSL mode).

The foregoing description of the invention includes preferred forms thereof. Modifications may be made thereto without departing from the scope of the invention as defined by the accompanying claims.

The invention claimed is:

1. A radiation dosimeter detection system for recording dose information about ionizing radiation absorbed and stored in one or more dosimeters located in an environment exposed to a radiation source(s), comprising:
at least one dosimeter comprising a phosphor-doped fluoroperovskite compound that is configured to absorb radiation from the environment within which it is located, the dosimeter being optically coupled to a detector by an optical fibre, the detector comprising:
a first optical stimulation source that is operable to emit stimulating light over the optical fibre to the dosimeter at a wavelength(s) in a first wavelength range;
a second optical stimulation source that is operable to emit stimulating light over the optical fibre to the dosimeter at a wavelength(s) in a second wavelength range;
an optical detector that is configured to receive and sense light emitted from the dosimeter over the optical fibre and which in response generates light detection signals representing the dose information stored in the dosimeter; and
a control system that is configured to read out the dose information by processing the light detection signals from the optical detector and outputting the dose information, and which is operable or configured to selectively control either or both of the first or second optical stimulation sources so as to selectively read-out the dose information, wherein the control system is selectively operable in Radio Luminescence (RL) mode or Radio and Optically Stimulated Luminescence (ROSL) mode, and wherein the control system is operable to selectively activate or deactivate either or both of the first or second optical stimulation sources for reading out dose information in the form of instantaneous dose rate from the dosimeter based on the RL or ROSL emitted light signal from the dosimeter.

2. A radiation dosimeter detection system according to claim 1 wherein the control system is further selectively operable in one or more read-out modes via selective control of the optical stimulation sources, the or each read-out mode being configured to read out the dose information in one or more of the following forms: instantaneous dose rate, short irradiation dose, or cumulative dose.

3. A radiation dosimeter detection system according to claim 2 wherein the control system is further selectively operable in Optically Stimulated Luminescence (OSL) mode or Optically Pulsed Radio and Optically Stimulated Luminescence (OPROSL) mode, and wherein when operating in these modes the first optical stimulation source is operable to emit stimulating light over the optical fibre to the dosimeter at a wavelength(s) in the first wavelength range for reading-out from the dosimeter, via the optical detector, dose information in the form of the instantaneous dose rate based on the OPROSL emitted light signal from the dosimeter or the short irradiation dose after a short irradiation and based on the OSL emitted light signal from the dosimeter; and the second optical stimulation source that is operable to emit stimulating light over the optical fibre to the dosimeter at wavelength(s) in the second wavelength range for reading-out from the dosimeter, via the optical detector, dose information in the form of the cumulative dose based on the OSL emitted light signal from the dosimeter, and wherein the control system is operable to selectively operate the first optical stimulation source to enable reading-out, via the optical detector, of dose information in the form of instantaneous dose rate or dose after a short irradiation, and the second optical stimulation source to enable reading-out, via the optical detector, of dose information in the form of cumulative dose.

4. A radiation dosimeter detection system according to claim 3 wherein the first wavelength range of the first optical stimulation source is in the infrared band for reading-out instantaneous dose rate or short irradiation dose from the dosimeter in the OSL or OPROSL modes, and wherein the second wavelength range of the second optical stimulation source is in the ultraviolet to visible band for reading-out dose information in the form of cumulative dose from the dosimeter in an OSL mode after irradiation.

5. A radiation dosimeter detection system according to claim 3 wherein the control system is configured to operate the second optical stimulation source to emit continuous stimulating light to read-out dose information in the form of cumulative dose while simultaneously bleaching all the stored dose information to reset the dosimeter to zero.

6. A radiation dosimeter detection system according to claim 1 wherein in a high dose operational mode the control system is configured to operate the first and/or second optical stimulation sources to continuously emit stimulating light into the dosimeter during read-out of the instantaneous dose rate from the dosimeter in ROSL mode such that the emitted ROSL signal from the dosimeter during irradiation is substantially dose independent, and wherein the control system is configured to operate in the high dose operational mode for dosimeters exposed to high doses in the range of approximately 0.1 Sv to approximately 1000 Sv.

7. A radiation dosimeter detection system according to claim 6 wherein in the high dose operational mode wherein the first and/or second wavelength ranges are approximately 300 nm to 600 nm.

8. A radiation dosimeter detection system according to claim 1 wherein in a low dose operational mode the control system is configured to deactivate the first and/or second optical stimulation sources during read-out of the instantaneous dose rate from the dosimeter in RL mode as the emitted RL signal from the dosimeter during irradiation is substantially dose independent, and wherein the control system is configured to operate in the low dose operational mode for dosimeters exposed to low doses below approximately 0.1 Sv.

9. A radiation dosimeter detection system for recording dose information about ionizing radiation absorbed and stored in one or more dosimeters located in an environment exposed to a radiation source(s), comprising:
at least one dosimeter comprising a phosphor-doped fluoroperovskite compound that is configured to absorb radiation from the environment within which it is located, the dosimeter being optically coupled to a detector by an optical fibre, the detector comprising:
a first optical stimulation source that is operable to emit stimulating light over the optical fibre to the dosimeter at a wavelength(s) in a first wavelength range;
a second optical stimulation source that is operable to emit stimulating light over the optical fibre to the dosimeter at a wavelength(s) in a second wavelength range;
an optical detector that is configured to receive and sense light emitted from the dosimeter over the optical fibre and which in response generates light detection signals representing the dose information stored in the dosimeter; and
a control system that is configured to read out the dose information by processing the light detection signals from the optical detector and outputting the dose information, and which is operable or configured to selectively control either or both of the first or second optical stimulation sources so as to selectively read-out the dose information, wherein the optical detector comprises a photomultiplier tube (PMT) that is connected to a photon counter module that generates the light detection signals in the form of an output pulse signal for each pulse detected, and wherein the optical stimulation sources configured to emit stimulating light at wavelengths that are longer than the detection wavelength range of the PMT, and wherein the control system comprises a pulse stretching module that is configured to increase the width of the pulses of the output pulse signal from the photon counter module and output a modified pulse signal for extraction of the read-out dose information.

10. A radiation dosimeter detection system according to claim 1 wherein the phosphor-doped fluoroperovskite compound of the dosimeter is selected from the following: $NaMgF_3:Eu^{2+}$, $NaMgF_3:Mn^{2+}$, $RbMgF3:Eu2+$, $RbMgF_3:Mn^{2+}$, $RbCdF_3:Mn^{2+}$, and $CsCdF_3:Mn^{2+}$.

11. A method for real-time Radio Luminescence (RL) and/or Radio and Optically Stimulated Luminescence (ROSL) dose rate measuring in an environment exposed to a radiation source(s), comprising the steps of:
exposing a dosimeter to the environment for irradiation by the radiation source(s) at a high dose in the range of approximately 0.1 Sv to approximately 1000 Sv, the dosimeter comprising a phosphor-doped fluoroperovskite compound;
sensing the RL or ROSL emitted light from the dosimeter during irradiation by the radiation source(s) and generating a representative RL or ROSL light detection signal;
recording or generating a real-time measure of dose rate in the environment based on the light detection signal; and
continually illuminating the dosimeter with stimulating light at a wavelength(s) in a wavelength range of approximately 300 nm to approximately 600 nm during irradiation and sensing the ROSL emitted light during the illumination of the dosimeter such that the ROSL emitted light is substantially dose dependent.

12. A method according to claim 11 wherein the stimulating light is continuous light that is not pulsed.

13. A method according to claim 11 wherein the step of continually illuminating the dosimeter comprises operating a light stimulation source to emit the stimulating light to the dosimeter over an optical fibre that couples the light stimulation source to the dosimeter.

14. A method according to claim 11 wherein the step of generating a real-time measure of dose rate in the environment is based on a directly proportional relationship of the dose rate to the ROSL light detection signal.

15. A method for real-time Radio Luminescence (RL) and/or Radio and Optically Stimulated Luminescence (ROSL) dose rate measuring in an environment exposed to a radiation source(s) comprising the steps of:
exposing a dosimeter to the environment for irradiation by the radiation source(s) at a low dose below approximately 0.1 Sv, the dosimeter comprising a phosphor-doped fluoroperovskite compound;
sensing the RL or ROSL emitted light from the dosimeter during irradiation by the radiation source(s) and generating a representative RL or ROSL light detection signal; and
recording or generating a real-time measure of dose rate in the environment based on the light detection signal, wherein the step of generating a real-time measure of dose rate in the environment is based on a directly proportional relationship of the dose rate to the RL light detection signal.

16. A method for real-time Radio Luminescence (RL) and/or Radio and Optically Stimulated Luminescence (ROSL) dose rate measuring in an environment exposed to a radiation source(s) comprising the steps of:
exposing a dosimeter to the environment for irradiation by the radiation source(s), the dosimeter comprising a phosphor-doped fluoroperovskite compound;
sensing the RL or ROSL emitted light from the dosimeter during irradiation by the radiation source(s) and generating a representative RL or ROSL light detection signal by generating a light detection signal in the form of a pulse signal for each photon detected; and recording or generating a real-time measure of dose rate in the environment based on the RL or ROSL light detection signal by photon-counting the pulse signal to generate a measure of dose rate, and wherein the count rate is directly proportional to the dose rate.

* * * * *